United States Patent
Lee et al.

(10) Patent No.: US 11,394,106 B2
(45) Date of Patent: Jul. 19, 2022

(54) ELECTRONIC DEVICE COMPRISING PLURALITY OF TRANSMIT ANTENNAS AND WIRELESS COMMUNICATION CONTROL METHOD USING SAME

(71) Applicant: Samsung Electronics Co., Ltd., Suwon-si (KR)

(72) Inventors: Dong Ju Lee, Suwon-si (KR); Won Jin Choi, Suwon-si (KR); Bong Sup Son, Suwon-si (KR); Moon Hyuk Choi, Suwon-si (KR); Se Woong Ahn, Suwon-si (KR); Su Ho Jin, Suwon-si (KR); Jung Hyun Park, Suwon-si (KR); Sung Jun Kim, Suwon-si (KR); Sung Chul Park, Suwon-si (KR); Ji Woo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 61 days.

(21) Appl. No.: 16/767,711

(22) PCT Filed: Nov. 5, 2018

(86) PCT No.: PCT/KR2018/013326
§ 371 (c)(1),
(2) Date: May 28, 2020

(87) PCT Pub. No.: WO2019/107777
PCT Pub. Date: Jun. 6, 2019

(65) Prior Publication Data
US 2021/0005954 A1    Jan. 7, 2021

(30) Foreign Application Priority Data

Nov. 28, 2017  (KR) .......................... 10-2017-0160784

(51) Int. Cl.
*H01Q 1/26* (2006.01)
*H01Q 1/24* (2006.01)
(Continued)

(52) U.S. Cl.
CPC ................ *H01Q 1/243* (2013.01); *H01Q 1/38* (2013.01); *H04B 1/401* (2013.01); *H04B 7/0602* (2013.01)

(58) Field of Classification Search
CPC .............. C07K 14/4737; C12Q 1/6883; C12Q 2600/156; H01Q 1/243; H01Q 1/38;
(Continued)

(56) References Cited

U.S. PATENT DOCUMENTS

2008/0139128 A1   6/2008  Liao
2009/0286495 A1  11/2009  Martikkala et al.
(Continued)

FOREIGN PATENT DOCUMENTS

JP   2012227620 A   11/2012
KR  2001-0009142 A   2/2001
(Continued)

OTHER PUBLICATIONS

International Search Report dated Feb. 15, 2019 in connection with International Patent Application No. PCT/KR2018/013326, 2 pages.
(Continued)

*Primary Examiner* — Thien M Le

(57) ABSTRACT

Various embodiments of the present invention relate to an electronic device comprising a wireless communication circuit, and a portable communication device. An electronic device, according to one embodiment, comprises: a housing including a side member that forms the sides of the electronic device; a touchscreen display which is at least partially housed in the housing so as to be visually exposed to the outside; a first conductive portion formed from a first
(Continued)

portion of the side member; a second conductive portion formed from a second portion of the side member, opposite to the first portion when viewed from the top of the touch screen display exposed to the outside; and at least one wireless communication circuit electrically connected to a first point within the first portion and a second point within the second portion, wherein the at least one wireless communication circuit can be configured to support transmit diversity by generating a first signal having a first phase of a primary configuration carrier and a second signal having a second phase of the primary configuration carrier, transmitting the first signal through the first conductive portion, and transmitting the second signal through the second conductive portion. Other various embodiments are possible.

15 Claims, 25 Drawing Sheets

(51) Int. Cl.
*H01Q 1/38* (2006.01)
*H04B 1/401* (2015.01)
*H04B 7/06* (2006.01)

(58) Field of Classification Search
CPC ........ H01Q 1/24; H01Q 21/28; H01Q 9/0421; H04B 1/401; H04B 7/0602; H04B 7/06; H04B 7/0617
See application file for complete search history.

(56) References Cited

U.S. PATENT DOCUMENTS

| | | | | |
|---|---|---|---|---|
| 2013/0207854 A1* | 8/2013 | Ryu | ........................ | H01Q 21/28 343/702 |
| 2014/0029465 A1 | 1/2014 | Nagata et al. | | |
| 2014/0300518 A1 | 10/2014 | Ramachandran et al. | | |
| 2015/0110229 A1 | 4/2015 | Kim | | |
| 2015/0147984 A1 | 5/2015 | Ying et al. | | |
| 2015/0340757 A1* | 11/2015 | Rho | ........................ | H01Q 9/42 343/702 |
| 2015/0364820 A1 | 12/2015 | Dong et al. | | |
| 2016/0197396 A1* | 7/2016 | Choi | ........................ | H01Q 1/48 343/702 |
| 2016/0197403 A1* | 7/2016 | Choi | ........................ | H01Q 1/38 343/700 MS |
| 2016/0211870 A1 | 7/2016 | Wu et al. | | |
| 2016/0276748 A1 | 9/2016 | Ramachandran et al. | | |
| 2017/0294932 A1* | 10/2017 | Kang | ........................ | G06F 1/1656 |
| 2018/0006774 A1 | 1/2018 | Yiu et al. | | |
| 2019/0058244 A1* | 2/2019 | Kim | ........................ | H01Q 1/48 |
| 2019/0074601 A1 | 3/2019 | Kim et al. | | |
| 2019/0132430 A1* | 5/2019 | Yoo | ........................ | H01Q 9/30 |

FOREIGN PATENT DOCUMENTS

| | | |
|---|---|---|
| KR | 10-2015-0046689 A | 4/2015 |
| KR | 10-2017-0105855 A | 9/2017 |
| WO | 2016/164081 A1 | 10/2016 |

OTHER PUBLICATIONS

Written Opinion of the International Searching Authority dated Feb. 15, 2019 in connection with International Patent Application No. PCT/KR2018/013326, 9 pages.

Korean Intellectual Property Office, "Decision of Patent," dated Mar. 29, 2022, in connection with Korean Patent Application No. 10-2017-0160784, 5 pages.

* cited by examiner

[0-90°]

FIG. 11A
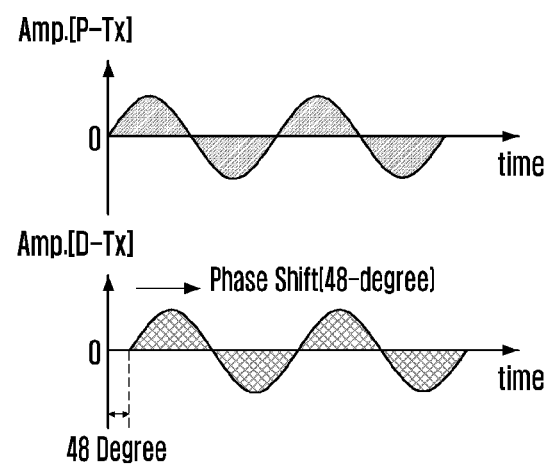
[A] Clockwise Phase Offset(1-Slot)
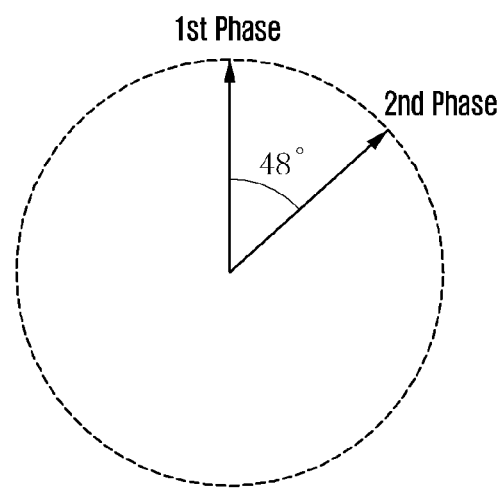

FIG. 11B
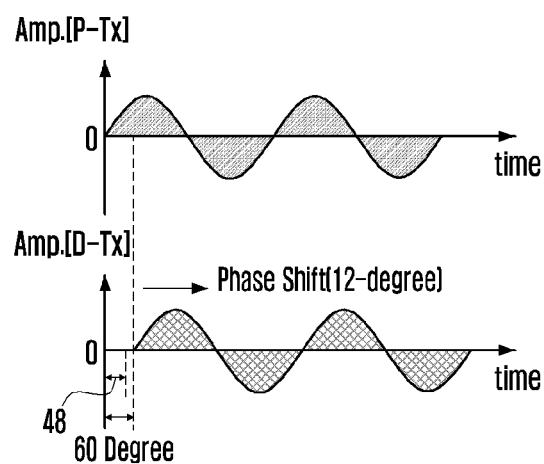
[B] TPC1/2 Comparison(TPC1 > TPC2)
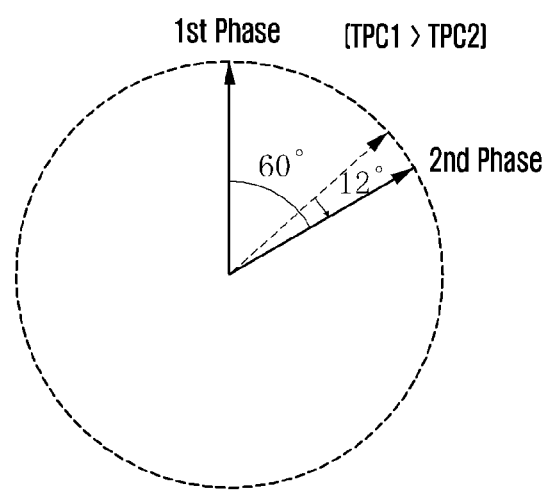

FIG. 11C
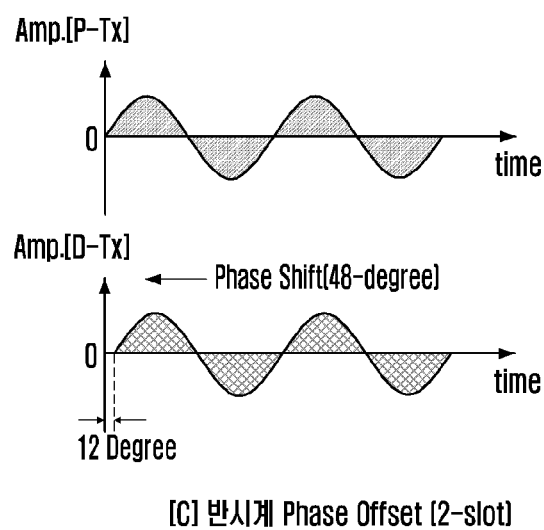
[C] 반시계 Phase Offset (2-slot)
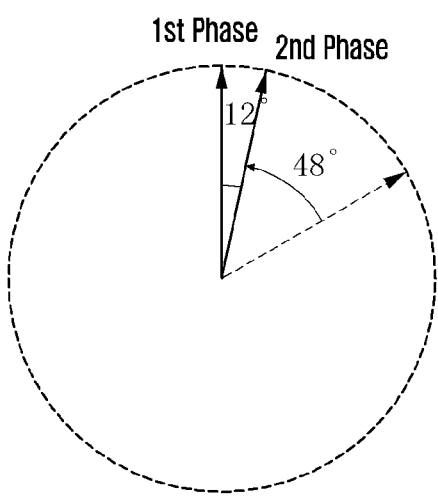

ELECTRONIC DEVICE COMPRISING PLURALITY OF TRANSMIT ANTENNAS AND WIRELESS COMMUNICATION CONTROL METHOD USING SAME

CROSS-REFERENCE TO RELATED APPLICATIONS

This application is a 371 of International Application No. PCT/KR2018/013326 filed on Nov. 5, 2018, which claims priority to Korean Patent Application No. 10-2017-0160784 filed on Nov. 28, 2017, the disclosures of which are herein incorporated by reference in their entirety.

BACKGROUND

1. Field

Various embodiments of the disclosure relate to an electronic device including a plurality of transmission antennas and a wireless communication control method using the same.

2. Description of Related Art

Due to development of wireless communication technologies, networks such as base stations are being widely used.

The electronic devices, such as smartphones, may perform wireless communication with another electronic device through a network.

The electronic devices may be provided with at least one antenna to perform wireless communication with another electronic device through a network.

At least a portion of a housing of an electronic device may include a conductive material (e.g., metal). At least a portion of the housing of the electronic device may be used as an antenna.

The housing of the electronic device may include aside member that connects a first plate (e.g., a glass cover) and a second plate (e.g., a battery cover) and defines side surfaces of the electronic device.

When the side member of the electronic device is used as an antenna, transmission performance deteriorates and a problem such as a call drop may occur if the signal quality of a wireless link is lowered to a threshold value or less.

Accordingly, in order to secure a stable transmission performance of the electronic device, the electronic device may include a transmission (Tx) diversity, and it is necessary to enhance transmission quality by using a combination of antennas used when a transmission diversity or an uplink carrier aggregation signal is transmitted.

The disclosure provides an electronic device including a plurality of transmission antennas and a wireless communication control method using the same, by which a transmission diversity and an uplink carrier aggregation that allows beam forming can be supported.

SUMMARY

In accordance with an aspect of the disclosure, an electronic device may include: a first plate including a first peripheral portion having a first length and extending in a first direction, a second peripheral portion having a second length that is longer than the first length and extending in a second direction that is substantially perpendicular to the first direction, a third peripheral portion having the first length and extending in parallel to the first peripheral portion, and a fourth peripheral portion having the second length and extending in parallel to the second peripheral portion; a second plate facing an opposite side of the first plate; and a housing including a side member including a first conductive portion having a third length that is shorter than the first length, extending along the first peripheral portion, and including a first end and a second end, a second conductive portion having a fourth length that is shorter than the first length, extending along the third peripheral portion, and including a first end and a second end, a third conductive portion extending from a portion that is adjacent to the first end of the first conductive portion to a portion that is adjacent to the first end of the second conductive portion along the first peripheral portion, the second peripheral portion, and the third peripheral portion, a fourth conductive portion extending from a portion that is adjacent to the second end of the first conductive portion to a portion that is adjacent to the second end of the second conductive portion, a first nonconductive portion between the first end of the first conductive portion and the third conductive portion, a second nonconductive portion between the second end of the first conductive portion and the fourth conductive portion, a third nonconductive portion between the first end of the second conductive portion and the third conductive portion, and a fourth nonconductive portion between the second end of the second conductive portion and the fourth conductive portion, the side member surrounding a space between the first plate and the second plate; a touch screen display visually exposed through the first plate; and at least one wireless communication circuit electrically connected to a first point in the first conductive portion, a second point in the second conductive portion, a third point in the third conductive portion, which is adjacent to the third nonconductive portion, or a fourth point in the fourth conductive portion, which is adjacent to the second nonconductive portion, wherein the at least one wireless communication circuit is configured to: receive a first downlink signal through the first point or the second point and a second downlink signal, which has a frequency that is higher than the frequency of the first downlink signal, through the third point or the fourth point, to support downlink carrier aggregation; transmit a third uplink signal through the first point or the second point and a fourth uplink signal, which has a frequency that is higher than the frequency of the third uplink signal, through the third point or the fourth point, to support uplink carrier aggregation; and transmit a fifth signal through the first point and the second point and a sixth signal, which has a frequency that is higher than the frequency of the fifth signal, through the third point and the fourth point, to support transmission diversity.

In accordance with another aspect of the disclosure, an electronic device may include: a housing including a side member defining sides of the electronic device; a touch-screen display, at least a portion of which is housed in the housing, to be visually exposed to the outside; a first conductive portion defined by a first portion of the side member; a second conductive portion defined by a second portion of the side member; a third conductive portion defined by a third portion of the side member; a fourth conductive portion defined by a fourth portion of the side member; and at least one wireless communication circuit electrically connected to a first point in the first portion, a second point in the second portion, a third point in the third portion, and a fourth point in the fourth portion, the first point is spaced apart from the third point by a first distance, the second point is spaced apart from the third point by a second distance that is smaller than the first distance, and the fourth point is spaced apart from the third point by a third distance that is larger than the first distance, wherein the at least one wireless communication circuit is configured to: transmit a primary component carrier signal through the third conductive portion and the fourth conductive portion, to support transmission diversity; and transmit a secondary component carrier signal through the first conductive portion or the second conductive portion, to support uplink carrier aggregation.

In accordance with another aspect of the disclosure, an electronic device may include: a housing including a side member defining sides of the electronic device; a touch-screen display, at least a portion of which is housed in the housing, to be visually exposed to the outside; a first conductive portion defined by a first portion of the side member; a second conductive portion defined by a second portion of the side member, which is located on a side that is opposite to the first portion when viewed from the upper side of the touch screen display exposed to the outside; and at least one wireless communication circuit electrically connected to a first point in the first portion and a second point in the second portion, wherein the at least one wireless communication circuit is configured to: generate a first signal having a first phase of a primary component carrier and a second signal having a second phase of the primary component carrier, transmit the first signal through the first conductive portion; and transmit the second signal through the second conductive portion, to support transmission diversity.

In accordance with another aspect of the disclosure, an electronic device may include: a first plate including a first peripheral portion having a first length and extending in a first direction, a second peripheral portion having a second length that is longer than the first length and extending in a second direction that is substantially perpendicular to the first direction, a third peripheral portion having the first length and extending in parallel to the first peripheral portion, and a fourth peripheral portion having the second length and extending in parallel to the second peripheral portion; a second plate facing an opposite side of the first plate; a housing including a side member including a first conductive portion extending along the second peripheral portion, the first peripheral portion, and the fourth peripheral portion, and including a first end and a second end, a second conductive portion extending along the second peripheral portion, the third peripheral portion, the fourth peripheral portion, and including a first end and a second end, a third conductive portion extending from a portion that is adjacent to the first end of the first conductive portion to a portion that is adjacent to the first end of the second conductive portion along the second peripheral portion, a fourth conductive portion extending from a portion that is adjacent to the second end of the first conductive portion to a portion that is adjacent to the second end of the second conductive portion along the fourth peripheral portion, a first nonconductive portion between the first end of the first conductive portion and the third conductive portion, a second nonconductive portion between the second end of the first conductive portion and the fourth conductive portion, a third nonconductive portion between the first end of the second conductive portion and the third conductive portion, and a fourth nonconductive portion between the second end of the second conductive portion and the fourth conductive portion, the side member surrounding a space between the first plate and the second plate; a touch screen display visually exposed through the first plate; and at least one wireless communication circuit electrically connected to a first point in the first conductive portion, a second point in the second conductive portion, a third point in the second conductive portion, and a fourth point in the first conductive portion, wherein the first point and the fourth point are adjacent to the first peripheral portion and the second point and the third point are adjacent to the third peripheral portion, wherein a first distance from the first point to the first end of the first conductive portion is larger than a second distance from the fourth point to the first end of the first conductive portion, the first conductive portion is connected to a first ground, the first point is present adjacent to the second end of the first conductive portion with respect to the first ground, and the fourth point is present adjacent to the first end of the first conductive portion with respect to the first ground, wherein a third distance from the second point to the first end of the second conductive portion is shorter than a fourth distance from the third point to the first end of the second conductive portion, the second conductive portion is connected to a second ground, the second point is present adjacent to the first end of the second conductive portion with respect to the second ground, and the third point is present adjacent to the second end of the second conductive portion with respect to the second ground, and wherein the at least one wireless communication circuit is configured to: receive a first downlink signal through the first point or the second point and a second downlink signal, which has a frequency that is higher than the frequency of the first downlink signal, through the third point or the fourth point to support downlink carrier aggregation; transmit a third uplink signal through the first point or the second point and a fourth uplink signal, which has a frequency that is higher than the frequency of the third uplink signal, through the third point or the fourth point to support uplink carrier aggregation; and transmit a fifth signal through the first point and the second point and a sixth signal, which has a frequency that is higher than the frequency of the fifth signal, through the third point and the fourth point to support transmission diversity.

In accordance with another aspect of the disclosure, a portable communication device may include: a wireless communication circuit configured to establish an external device and a wireless link; a memory configured to store a reference value that indicates a quality of the wireless link; a first conductive portion; a second conductive portion; and a processor, wherein the processor is configured to: measure the quality of the wireless link established between the portable communication device and a primary cell of a base station by using the wireless communication circuit; compare the measured quality and the stored reference value; transmit a first signal of a first phase of a primary component carrier through the first transmission antenna; and transmit a second signal having a second phase of the primary component carrier through the second transmission antenna when the measured quality is the reference value or less.

According to various embodiments, wireless link quality can be improved by using the housing of an electronic device as an antenna and controlling a wireless communication circuit designed in the interior of the electronic device to support a transmission (Tx) diversity and an uplink carrier aggregation that allows beam forming.

BRIEF DESCRIPTION OF THE DRAWINGS

FIGS. 11A to 11C are views illustrating an operation of controlling a phase between a primary transmission (P-TX) signal and a diversity transmission (D-TX) signal by an electronic device according to various embodiments of the disclosure;

DETAILED DESCRIPTION

Figure 1:
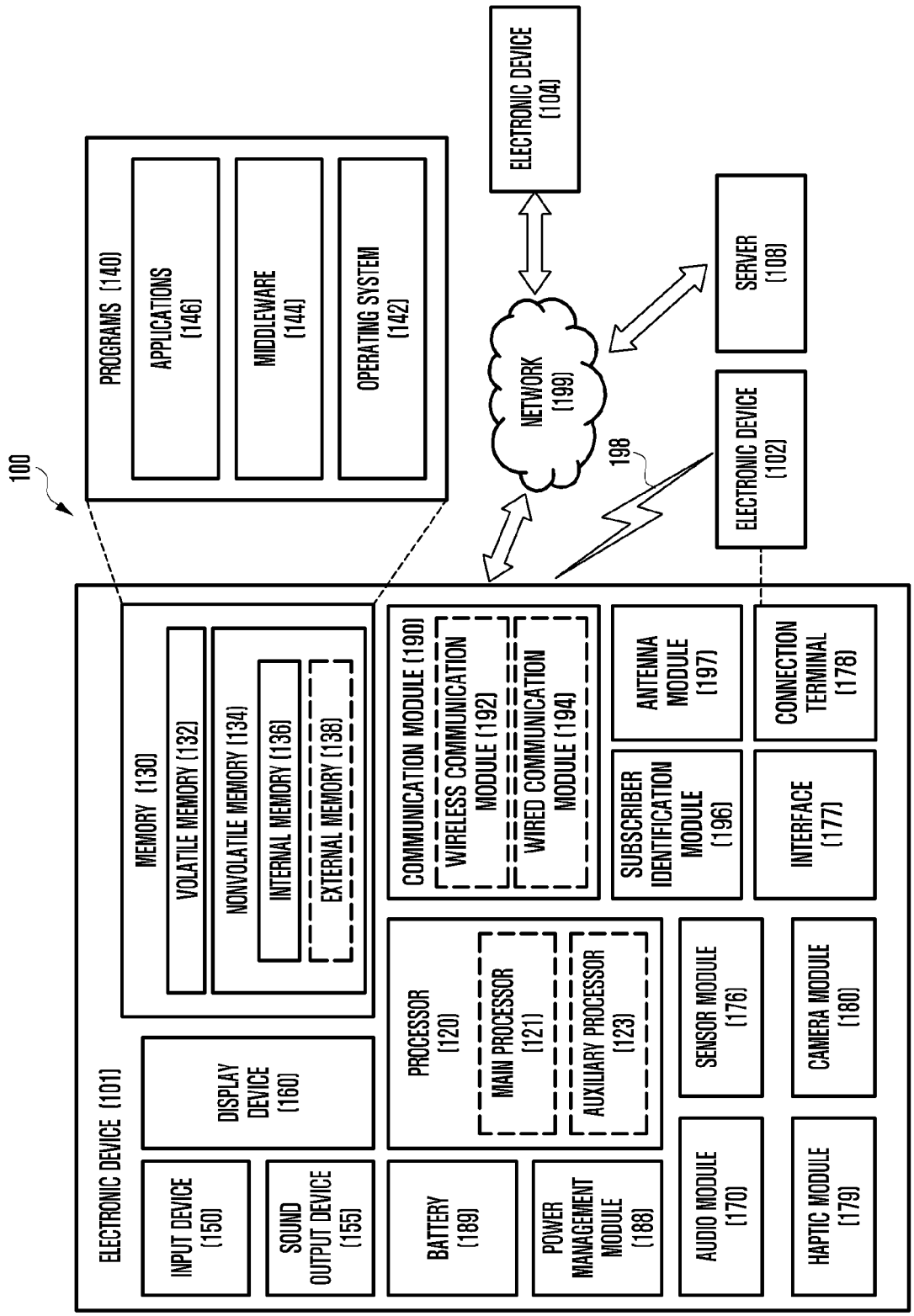
FIG. 1 is a block diagram of an electronic device in a network environment according to various embodiments of the disclosure.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform certain data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store certain data used by at least one component (e.g., the processor 120 or the sensor module 176) of the electronic device 101. The certain data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These certain types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit/receive a signal or power to/from an external entity (e.g., an external electronic device). According to some embodiments, the antenna module 197 may be formed of a conductor or a conductive pattern and may further include any other component (e.g., RFIC). According to an embodiment, the antenna module 197 may include one or more antennas, which may be selected to be suitable for a communication scheme used in a specific communication network, such as the first network 198 or the second network 199 by, for example, the communication module 190. Through the selected at least one antenna, a signal or power may be transmitted or received between the communication module 190 and the external electronic device.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of certain types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include certain changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

The module or programming module of the present disclosure may include at least one of the aforementioned components with omission of some components or addition of other components. The operations of the modules, programming modules, or other components may be executed in series, in parallel, recursively, or heuristically. Also, some operations may be executed in different order, omitted, or extended with other operations.

Figure 2:
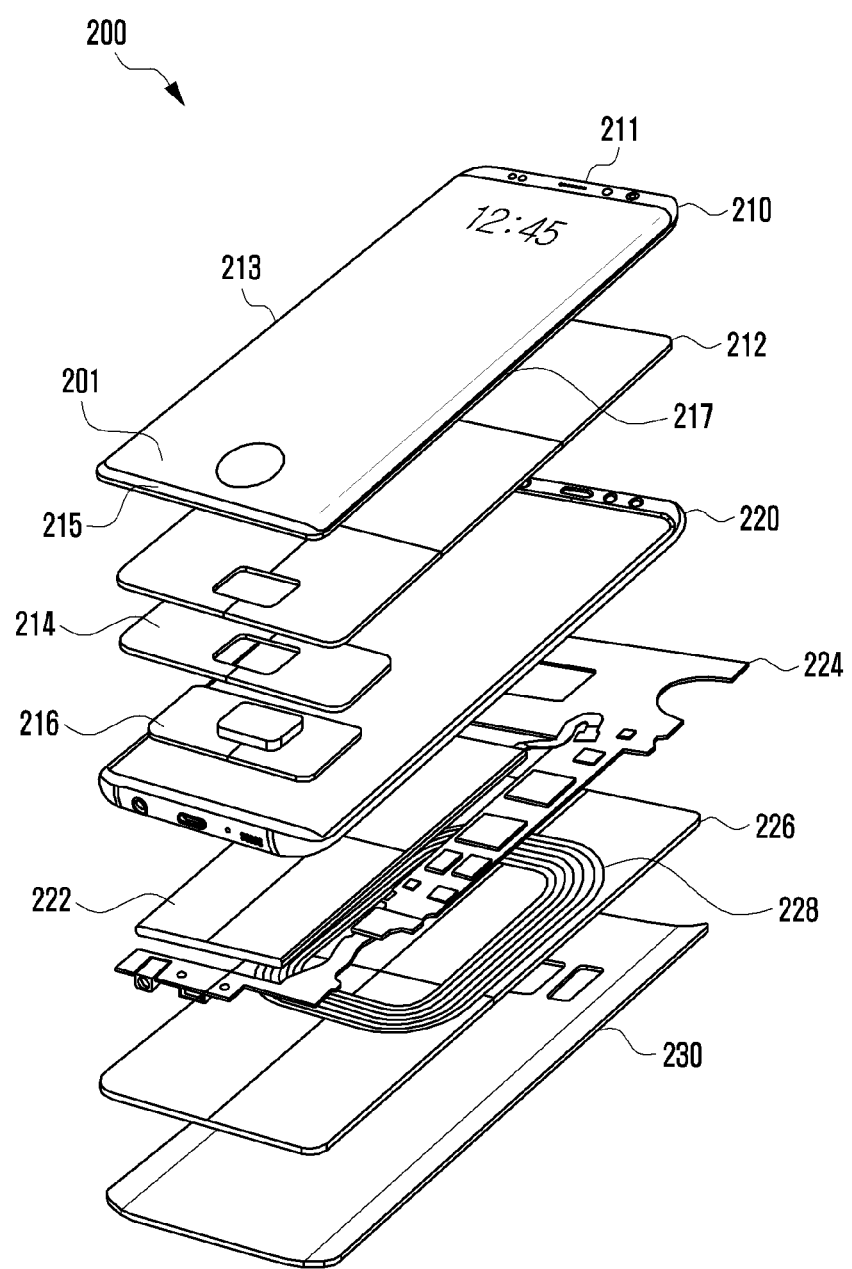
FIG. 2 is a view schematically illustrating a configuration of an electronic device according to various embodiments of the disclosure.

FIG. 2 is a view schematically illustrating a configuration of an electronic device according to various embodiments of the disclosure.

Referring to FIG. 2, an electronic device 200 according to various embodiments of the disclosure may include a first plate 210, a digitizer panel 212, a force touch panel 214, a biometric sensor 216 (e.g., a fingerprint sensor), a housing 220, a battery 222, a printed circuit board (PCB) 224, a wireless charging FPCB 226, a wireless charging coil 228, and/or a second plate 230.

According to various embodiments, the first plate 210, the digitizer panel 212, the force touch panel 214, and/or the biometric sensor 216 (e.g., a fingerprint sensor) may be housed at an upper portion of the housing 220. The battery 222, the printed circuit board (PCB) 224, the wireless charging FPCB 226, the wireless charging coil 228, and/or the second plate 230 may be housed at a lower portion of the housing 220. At least one of the elements of the electronic device 200 may be omitted or another element may be added. An outer exposed surface of the housing 220 of the electronic device 200 may be used as an antenna. According to various embodiments, the electronic device 200, for example, may include at least some of the electronic devices 101, 102, and 104 of FIG. 1.

The first plate 210, for example, may be a cover (e.g., a glass cover) that constitutes a front surface of the electronic device 200. The first plate 210 may have a rectangular shape when viewed from the upper side The first plate 210 may include a first peripheral portion 211 having a first length and extending in a first direction, a second peripheral portion 213 having a second length that is longer than the first length and extending in a second direction that is substantially perpendicular to the first direction, a third peripheral portion 215 having the first length and extending in parallel to the first peripheral portion, and a fourth peripheral portion 217 having the second length and extending in parallel to the second peripheral portion. The first plate 210 may be a window cover that covers a touchscreen display 201. The first plate 210 may visually expose the touchscreen display 201 through at least a portion thereof. The touchscreen display 201 may display an image. The touchscreen display 201 may perform an input function and/or a display function. The touchscreen display 201 may include a touch panel and/or a display. According to various embodiments, the touchscreen display 201 may include a display device 160 of FIG. 1. At least a portion of the touchscreen display 201 may be housed in the housing 220 such that the touchscreen display 201 is visually exposed to the outside.

The digitizer panel 212 may receive an X coordinate and a Y coordinate for a user touch that is input through the touchscreen display 201.

The force touch panel 214 may detect a touch pressure input through the touchscreen display 201 and/or the digitizer panel 212. The force touch panel 214 may replace a home key of the electronic device 200.

The biometric sensor 216 may perform user authentication on the basis of the biometric information of the user. For example, the biometric sensor 216 (e.g., a fingerprint sensor) may receive fingerprint information of the user through the touchscreen display 201, and may perform user authentication on the basis of the received fingerprint information. According to various embodiments, the biometric sensor 216 may include at least a portion of the sensor module 176 of FIG. 1.

The housing 220 may include aside member (e.g., the side member 300 of FIG. 3A) that houses the elements in the above-described electronic device 200. The housing 220 including the side member may define sides of the electronic device 200. At least a portion of the outer exposed surface of the side member may include a conductive material (e.g., metal). The side member of the housing 220 may be used as an antenna of the electronic device 200. The side member may be used as an inverted F antenna. The housing 220 may surround a space between the first plate 210 and the second plate 230 through the side member when the first plate 210 and the second plate 230 are stacked.

The battery 222 may supply electric power that is necessary for driving of the electronic device 200. According to various embodiments, the battery 222 may include the battery 189 of FIG. 1.

The printed circuit board (PCB) 224 may include a processor (e.g., the processor 120 of FIG. 1) that is necessary for an operation of the electronic device 200, a memory (e.g., the memory 130 of FIG. 1), a communication module (e.g., the communication module 190 of FIG. 1), and/or a power management module (e.g., the power management module 188 of FIG. 1). The printed circuit board (PCB) 224 may include a printed board assembly, in which various connectors such as a battery contact are disposed, and/or a flexible printed board assembly (FPCB). The communication module may include a wireless communication circuit of the electronic device 200. The wireless communication circuit may be electrically connected to the processor. At least a portion of the side member of the housing 220 may be connected to at least a portion of the wireless communication circuit.

The wireless charging FPCB 226 may wirelessly charge the battery 222. The wireless charging FPCB 226 may include a wireless charging coil 228. The wireless charging FPCB 226 may include a coil antenna for short distance communication, such as near field communication (NFC) and/or magnetic secure transmission (MST).

The second plate 230, for example, may be a cover (e.g., a battery cover) that constitutes a rear surface of the electronic device 200. The second plate 230 may be disposed to face a side that is opposite to the first plate 210. The second plate 230 may be located opposite to the first plate 210, and may face the first plate 210.

Figure 3A:
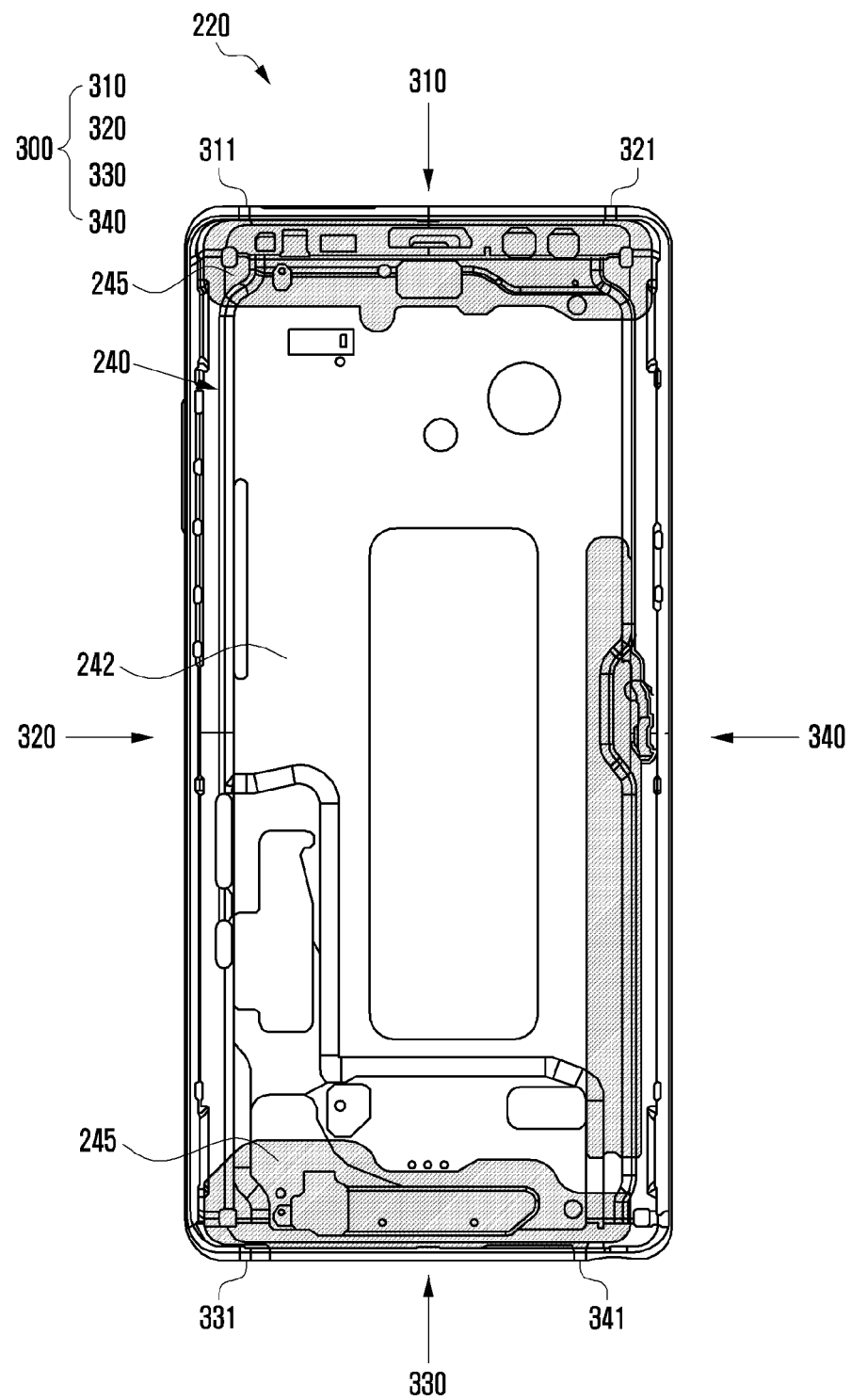
FIGS. 3A and 3B are views illustrating a front surface and a rear surface of a housing of an electronic device according to various embodiments of the disclosure.
Figure 3B:
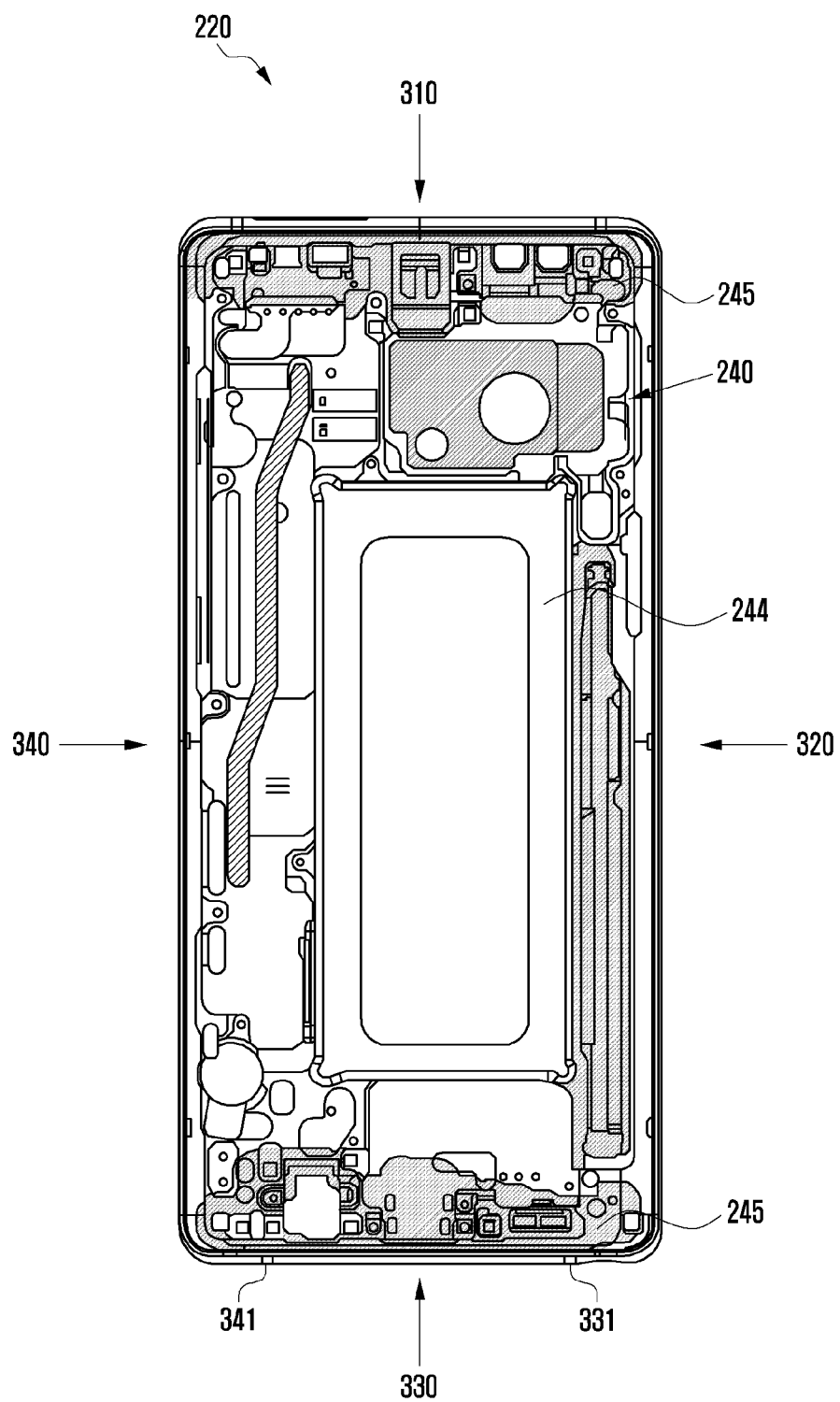

FIGS. 3A and 3B are views illustrating a front surface and a rear surface of a housing of an electronic device according to various embodiments of the disclosure.

Referring to FIGS. 3A and 3B, the housing 220 according to various embodiments of the disclosure may include a central portion 240 and/or a side member 300.

The central portion 240 may include a front surface 242 and a rear surface 244. The front surface 242 of the central portion 240, for example, may house and support the touchscreen display 201, the first plate 210, the digitizer panel 212, the force touch panel 214, and/or the biometric sensor 216 illustrated in FIG. 2. The rear surface 242 of the central portion 244, for example, may house and support the battery 222, the printed circuit board (PCB) 224, the wireless charging FPCB 226, the wireless charging coil 228, and/or the second plate 230 illustrated in FIG. 2.

The side member 300 may have a rectangular shape when viewed from the upper side. The side member 300 may be exposed to the outside of the housing 220. The side member 300 may be used as an antenna of the electronic device 200. The side member 300 may include a first peripheral portion 310, a second peripheral portion 320, a third peripheral portion 330, and a fourth peripheral portion 340.

The first peripheral portion 310 may have a first length and extend in a first direction. The second peripheral portion 320 may have a second length that is larger than the first length, and may extend in a second direction that is substantially perpendicular to the first direction. The third peripheral portion 330 may have the first length that is the same as the length of the first peripheral portion 310, and may extend in parallel to the first peripheral portion 310. The fourth peripheral portion 340 may have the second length that is the same as the length of the second peripheral portion 320, and may extend in parallel to the second peripheral portion 320.

A first nonconductive portion 311 may be disposed on one side of the first peripheral portion 310, and a second nonconductive portion 321 may be disposed on an opposite side. A third nonconductive portion 331 may be disposed on one side of the third peripheral portion 330, and a fourth nonconductive portion 341 may be disposed on an opposite side.

The first nonconductive portion 311, the second nonconductive portion 321, the third nonconductive portion 331, and/or the fourth nonconductive portion 341 may have slit shapes. The first nonconductive portion 3ii, the second nonconductive portion 321, the third nonconductive portion 331, and/or the fourth nonconductive portion 341 may be configured such that the side member 300 of the housing 220 may have an isolation structure.

A dielectric material 245 may be included at an upper portion and a lower portion of the front surface 242 and/or the rear surface 244 of the housing 220. The first nonconductive portion 311, the second nonconductive portion 321, the third nonconductive portion 331, and/or the fourth nonconductive portion 341 may be filled with a dielectric material 245. The dielectric material 245 may be an insulator (e.g., a nonconductor) including polyimide, plastic, a polymer, ceramic, or glass.

Figure 4A:
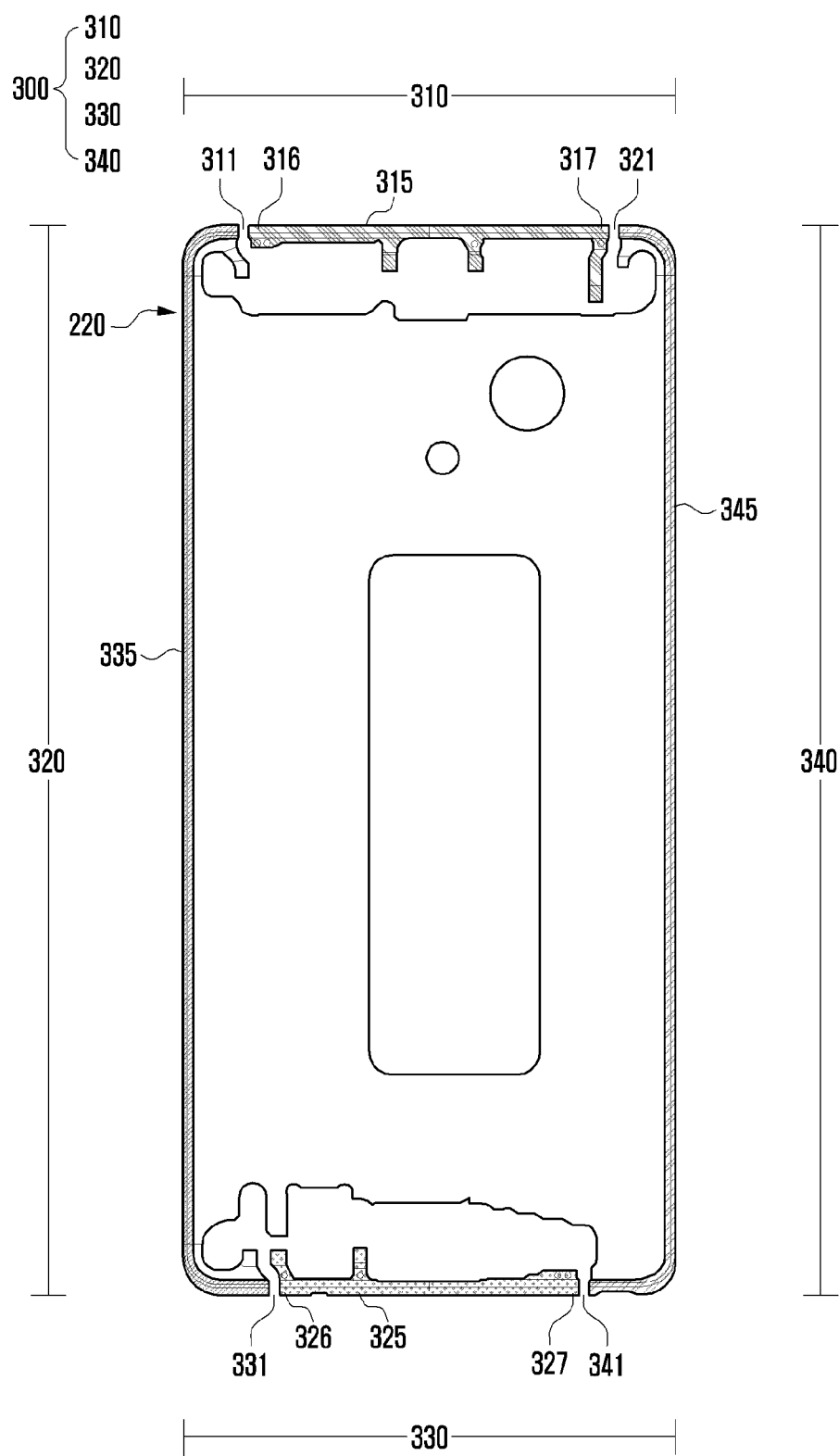
FIGS. 4A and 4B are views illustrating an antenna provided in a housing of an electronic device according to various embodiments of the disclosure.
Figure 4B:
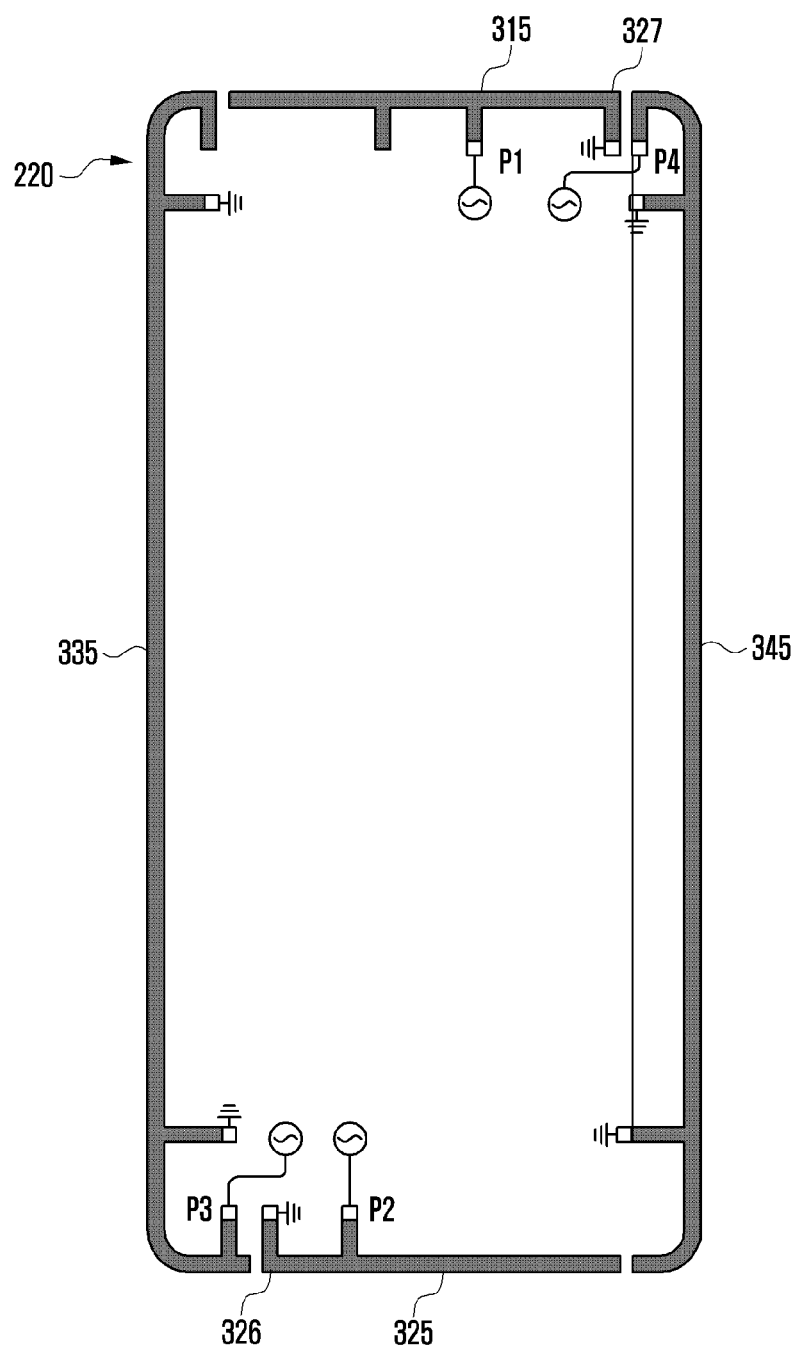

FIGS. 4A and 4B are views illustrating an antenna provided in a housing of an electronic device according to various embodiments of the disclosure.

Referring to FIGS. 4A and 4B, the housing 220 according to various embodiments of the disclosure may include a first conductive portion 315, a second conductive portion 325, a third conductive portion 335, and a fourth conductive portion 345, through the side member 300.

The first conductive portion 315 may have a third length that is smaller than the first length of the first peripheral portion 310 illustrated in FIG. 3A, and may extend along the first peripheral portion 310. The first conductive portion 315 may include a first end 316 and a second end 317. The first conductive portion 315 may be a first antenna element.

The second conductive portion 325 may have a fourth length that is smaller than the first length of the first peripheral portion 310, and may extend along the third peripheral portion 310. The second conductive portion 325 may include a first end 326 and a second end 327. The second conductive portion 325 may be a second antenna element.

The third conductive portion 335 may extend from a portion that is adjacent to the first end 316 of the first conductive portion 315 to a portion that is adjacent to the first end 326 of the second conductive portion 325 along the first peripheral portion 310, the second peripheral portion 320, and the third peripheral portion 330. The third conductive portion 335 may be a third antenna element.

The fourth conductive portion 345 may extend from a portion that is adjacent to the second end 317 of the first conductive portion 315 to a portion that is adjacent to the second end 327 of the second conductive portion 325 along the first peripheral portion 310, the fourth peripheral portion 340, and the third peripheral portion 330. The fourth conductive portion 345 may be a fourth antenna element.

A first nonconductive portion 311 may be disposed between the first end 316 of the first conductive portion 315 and an end of the third conductive portion 335. A second nonconductive portion 321 may be disposed between the second end 317 of the first conductive portion 315 and an end of the fourth conductive portion 345. A third nonconductive portion 331 may be disposed between the first end 326 of the second conductive portion 325 and an opposite end of the third conductive portion 335. A fourth nonconductive portion 341 may be disposed between the second end 327 of the second conductive portion 325 and an opposite end of the fourth conductive portion 345.

According to various embodiments, the side member 300 according to various embodiments of the disclosure may determine frequency characteristics on the basis of the physical lengths of the first conductive portion 315, the second conductive portion 325, the third conductive portion 335, and/or the fourth conductive portion 345. Referring to FIG. 4B, the physical lengths of the first conductive portion 315, the second conductive portion 325, the third conductive portion 335, and/or the fourth conductive portion 345 may be determined according to the lengths of a feeder and a ground.

According to an embodiment, a feeder may be disposed at a first point P1 of the first conductive portion 315. A second end 327 of the first conductive portion 315 may be connected to the ground. A feeder may be disposed at a second point P2 of the second conductive portion 325. A first end 326 of the second conductive portion 325 may be connected to the ground. The first conductive portion 315 and the second conductive portion 325 may be configured to transmit and receive a frequency signal (e.g., RX1/TX1) of the same band.

According to an embodiment, the entire first conductive portion 315 may be operated as an antenna. The entire second conductive portion 325 may be an antenna. Because the length of a portion of the first conductive portion 315 or the second conductive portion 325, which is operated as an antenna, is larger than the length of a portion of the third conductive portion 335 or the fourth conductive portion 345, which is operated as an antenna, the first conductive portion 315 or the second conductive portion 325 may be suitable for a low band frequency (e.g., about 600 MHz to 1800 MHz).

According to an embodiment, a feeder may be disposed at a third point P3 of the third conductive portion 335. At least one point of the third conductive portion 335 may be connected to the ground. The ground of the third conductive portion 335 may be located adjacent to the third point P3. The distance between the ground of the third conductive portion 335 and the third point P3 may be smaller than the length of the first conductive portion 315 or the second conductive portion 325. A feeder may be disposed at a fourth point P4 of the fourth conductive portion 345. At least one point of the fourth conductive portion 345 may be connected to the ground. The ground of the fourth conductive portion 345 may be located adjacent to the fourth point P4. The distance between the ground of the fourth conductive portion 345 and the fourth point P4 may be smaller than the length of the first conductive portion 315 or the second conductive portion 325.

According to an embodiment, the third conductive portion 335 may be operated as an antenna only from the ground disposed in the third conductive portion 335 to the third point P3. The fourth conductive portion 345 may be operated as an antenna only from the ground disposed in the fourth conductive portion 345 to the fourth point P4. The third conductive portion 335 and the fourth conductive portion 345 may be configured to transmit and receive a frequency signal (e.g., RX2/TX2) of the same band.

Because the length of a portion of the third conductive portion 335 or the fourth conductive portion 345, which is operated as an antenna, is shorter than the length of a portion of the first conductive portion 315 or the second conductive portion 325, which is operated as an antenna, the third conductive portion 335 or the fourth conductive portion 345 may be suitable for a high band frequency (e.g., about 1.5 GHz to 2.7 GHz).

Figure 5A:
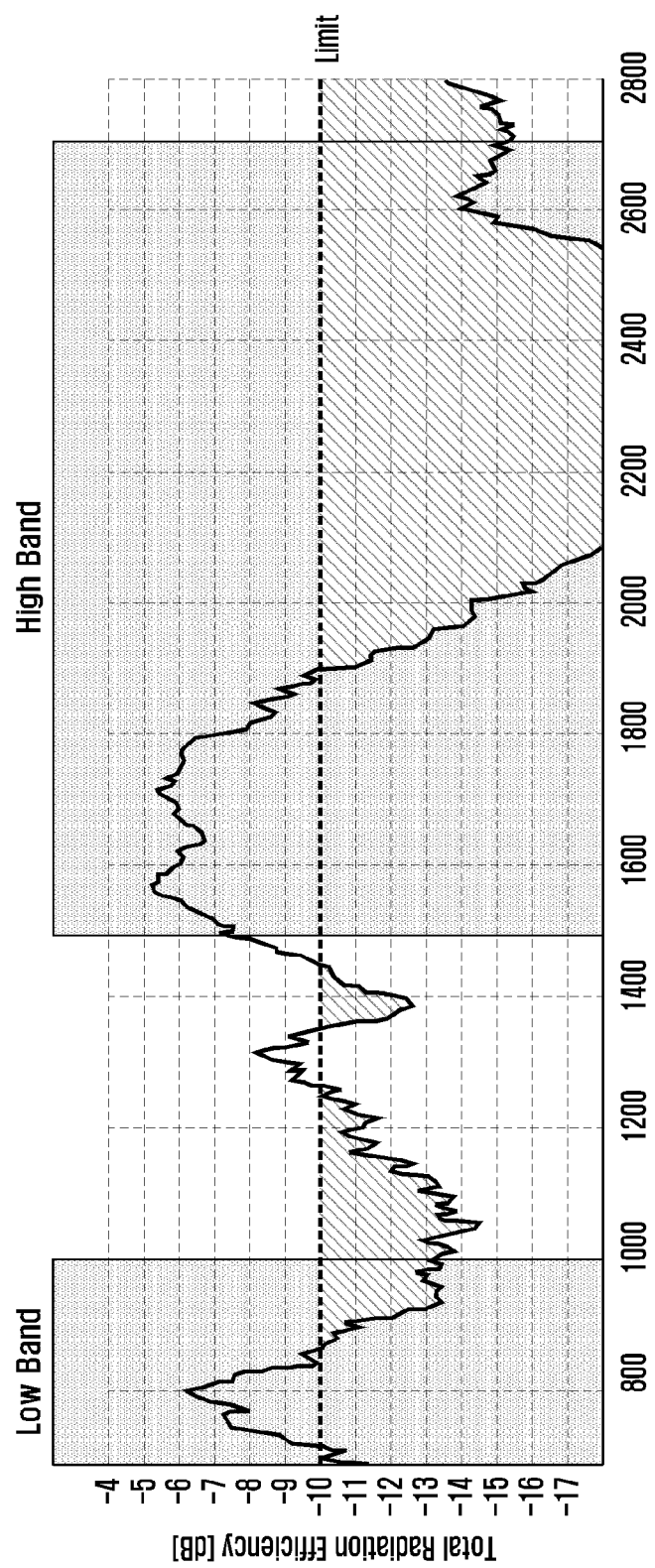
FIG. 5A is a view illustrating frequency characteristics of a first conductive portion and a second conductive portion of an electronic device according to various embodiments of the disclosure.
Figure 5B:
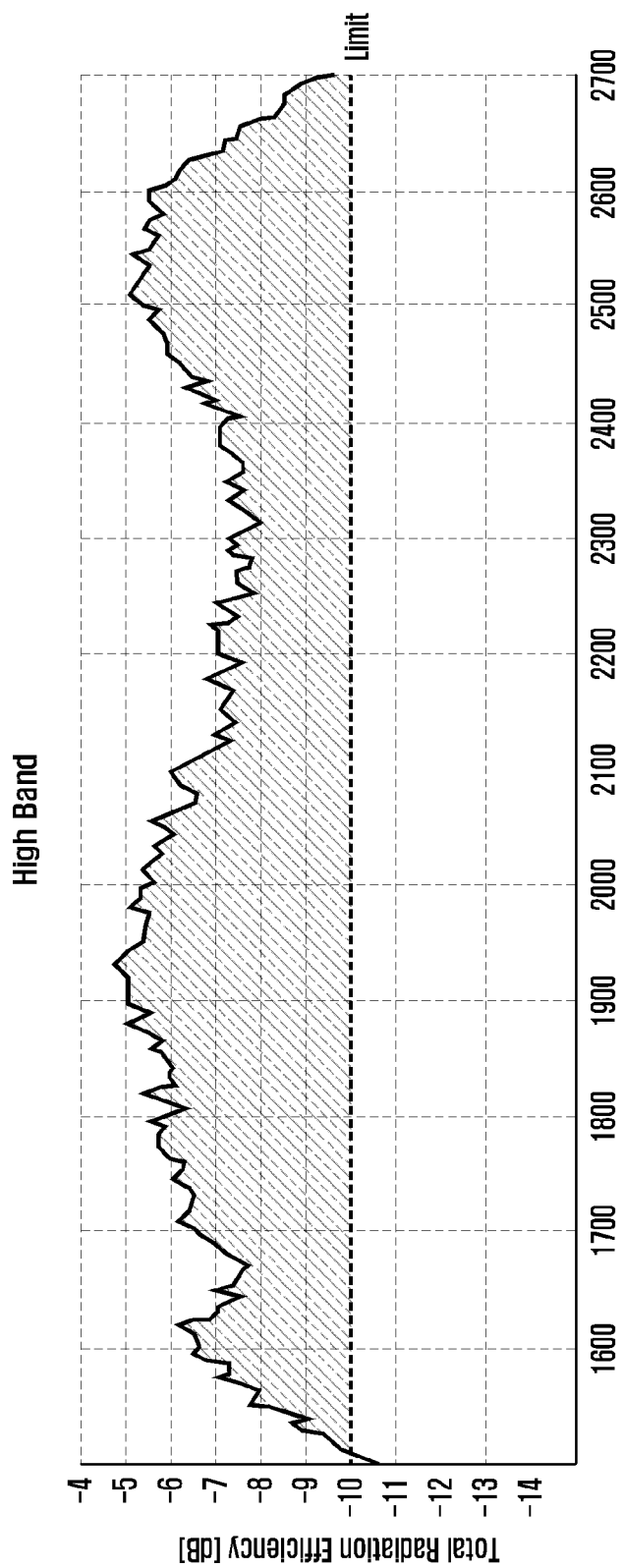
FIG. 5B is a view illustrating frequency characteristics of a third conductive portion and a fourth conductive portion of an electronic device according to various embodiments of the disclosure.

FIG. 5A is a view illustrating frequency characteristics of a first conductive portion and a second conductive portion of an electronic device according to various embodiments of the disclosure. FIG. 5B is a view illustrating frequency characteristics of a third conductive portion and a fourth conductive portion of an electronic device according to various embodiments of the disclosure.

Referring to FIG. 5A, it can be seen that the first conductive portion 315 and the second conductive portion 325 may show low band frequency (e.g., about 600 MHz to 1800 MHz) characteristics and cannot cover the high band frequency band as a whole. The first conductive portion 315 and the second conductive portion 325 may be suitable for the low band frequency characteristics.

Referring to FIG. 5B, it can be seen that the third conductive portion 335 and the fourth conductive portion 345 may show high band frequency (e.g., 1.5 GHz to 2.7 GHz) characteristics.

Figure 6A:
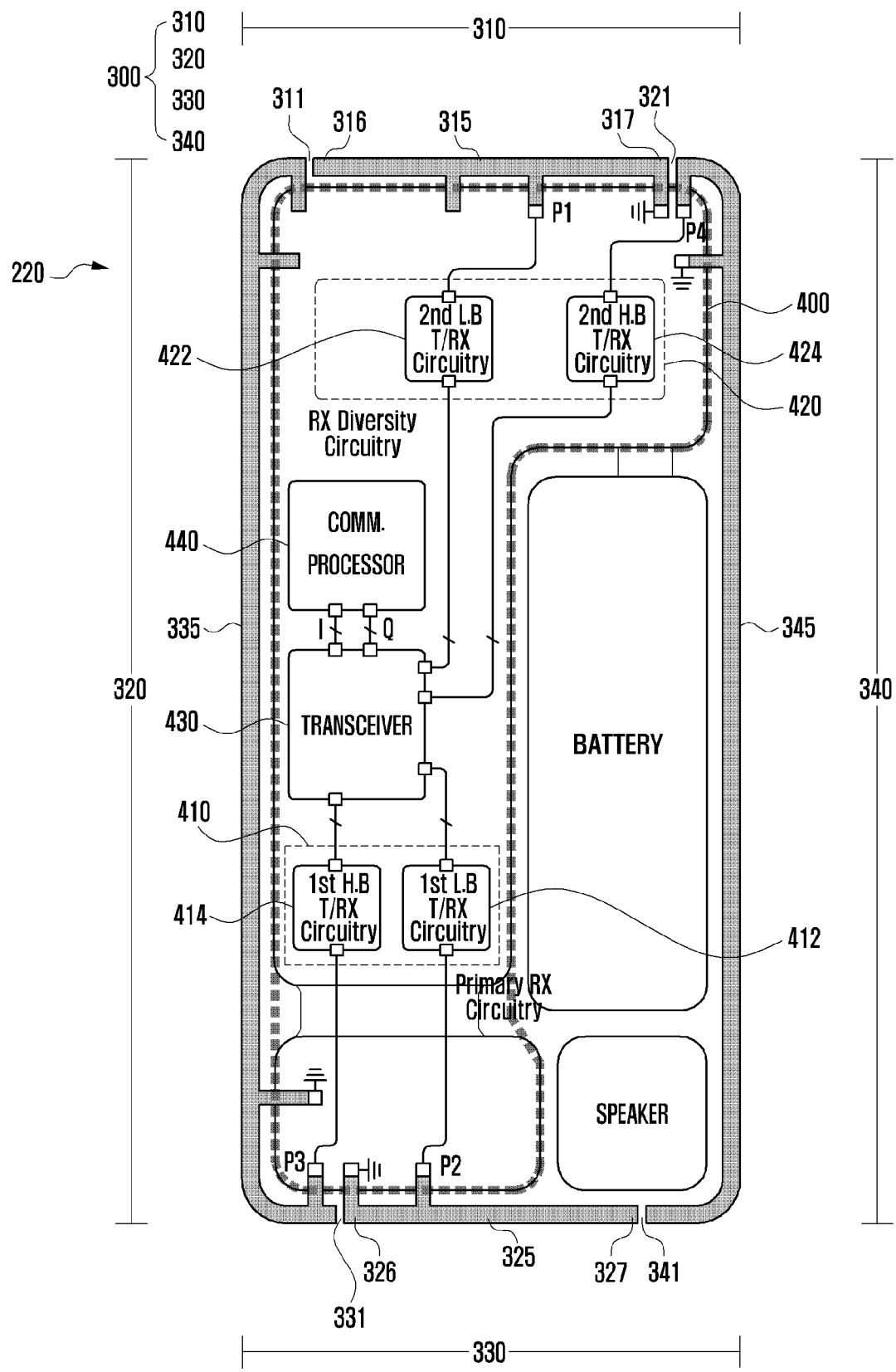
FIG. 6A is a view illustrating configurations of an antenna and a wireless communication circuit of an electronic device and an operation of a four-band downlink carrier aggregation (CA) function.

FIG. 6A is a view illustrating configurations of an antenna and a wireless communication circuit of an electronic device and an operation of a four-band downlink carrier aggregation (CA) function.

Referring to FIG. 6A, an electronic device 200 according to various embodiments of the disclosure may include a housing 220 having a side member 300 and a wireless communication circuit 400.

The side member 300 may include a first peripheral portion 310, a second peripheral portion 320, a third peripheral portion 330, and a fourth peripheral portion 340.

The first peripheral portion 310 may have a first length and extend in a first direction. The second peripheral portion 320 may have a second length that is larger than the first length, and may extend in a second direction that is substantially perpendicular to the first direction. The third peripheral portion 330 may have the first length that is the same as the length of the first peripheral portion 310, and may extend in parallel to the first peripheral portion 310. The fourth peripheral portion 340 may have the second length that is the same as the length of the second peripheral portion 320, and may extend in parallel to the second peripheral portion 320.

The side member 300 may include a first conductive portion 315, a second conductive portion 325, a third conductive portion 335, and a fourth conductive portion 345.

The first conductive portion 315 may have a third length that is smaller than the first length of the first peripheral portion 310, and may extend along the first peripheral portion 310. The first conductive portion 315 may include a first end 316 and a second end 317. The first conductive portion 315 may be a first antenna element.

The second conductive portion 325 may have a fourth length that is smaller than the first length of the first peripheral portion 310, and may extend along the third peripheral portion 310. The second conductive portion 325 may include a first end 326 and a second end 327. The second conductive portion 325 may be a second antenna element.

The third conductive portion 335 may extend from a portion that is adjacent to the first end 316 of the first conductive portion 315 to a portion that is adjacent to the first end 326 of the second conductive portion 325 along the first peripheral portion 310, the second peripheral portion 320, and the third peripheral portion 330. The third conductive portion 335 may be a third antenna element.

The fourth conductive portion 345 may extend from a portion that is adjacent to the second end 317 of the first conductive portion 315 to a portion that is adjacent to the second end 327 of the second conductive portion 325 along the first peripheral portion 310, the fourth peripheral portion 340, and the third peripheral portion 330. The fourth conductive portion 345 may be a fourth antenna element.

A first nonconductive portion 311 may be disposed between the first end 316 of the first conductive portion 315 and an end of the third conductive portion 335. A second nonconductive portion 321 may be disposed between the second end 317 of the first conductive portion 315 and an end of the fourth conductive portion 345. A third nonconductive portion 331 may be disposed between the first end 326 of the second conductive portion 325 and an opposite end of the third conductive portion 335. A fourth nonconductive portion 341 may be disposed between the second end 327 of the second conductive portion 325 and an opposite end of the fourth conductive portion 345.

A first point P1 may be disposed at a predetermined portion (e.g., a middle portion) of the first conductive portion 315. A second point P2 may be disposed at a predetermined portion (e.g., a middle portion) of the second conductive portion 325. A third point P3 may be disposed at a predetermined portion (e.g., a portion that is adjacent to the third nonconductive portion 331) of the third conductive portion 335. A fourth point P4 may be disposed at a predetermined portion (e.g., a portion that is adjacent to the second nonconductive portion 321) of the fourth conductive portion 345.

A second end 327 of the first conductive portion 315 may be connected to the ground. A first end 326 of the second conductive portion 325 may be connected to the ground. At least one point of the middle portion of the third conductive portion 335 may be connected to the ground. At least one point of the middle portion of the fourth conductive portion 345 may be connected to the ground.

The wireless communication circuit 400 may be electrically connected to the first point P1 in the first conductive portion 315, the second point P2 in the second conductive portion 325, the third point P3 in the third conductive portion 335, and/or the fourth point P4 in the fourth conductive portion 345.

The wireless communication circuit 400 may include a primary reception circuit 410, a reception diversity circuit 420, a transceiver 430, and/or a communication processor 440. The primary reception circuit 410 may include a first low band transmission/reception circuit 412 and/or a first high band transmission/reception circuit 414. The reception diversity circuit 420 may include a second low band transmission/reception circuit 422 and/or a second high band transmission/reception circuit 424. The locations of the elements in the wireless communication circuit 400 are not limited to those in FIGS. 6A and 6B, and may be variable.

The first low band transmission/reception circuit 412 may be connected to the second point P2 of the second conductive portion 325 and the transceiver 430. The second low band transmission/reception circuit 422 may be connected to the transceiver 430 and the first point P1 of the first conductive portion 315. The first high band transmission/reception circuit 414 may be connected to the third point P3 of the third conductive portion 335 and the transceiver 430. The second high band transmission/reception circuit 424 may be connected to the transceiver 430 and the fourth point P4 of the fourth conductive portion 345.

The wireless communication circuit 400 may receive a first downlink (DL) signal (e.g., B5 or B8) through the first point P1 of the first conductive portion 315 or the second point P2 of the second conductive portion 325 to support a downlink carrier aggregation. The wireless communication circuit 400 may receive a second downlink (DL) signal (e.g., B1, B3 or B7) having a frequency that is higher than the frequency of the first downlink (DL) signal through the third point P3 of the third conductive portion 335 or the fourth point P4 of the fourth conductive portion 345. According to an embodiment, the first downlink signal may include at least one downlink signal. The second downlink signal may include at least one downlink signal.

The at least one first downlink (DL) signal may have at least one frequency selected from the first downlink (DL) band or a second downlink (DL) that is higher than the first downlink (DL) band. The first downlink (DL) band and the second downlink (DL) band may have a frequency range selected from the frequencies between 600 MHz and 1800 MHz.

According to an embodiment, the at least one wireless communication circuit 400 may be configured to receive at least one frequency selected from a first downlink band having a first frequency range between 600 MHz and 1800 MHz or a second downlink band having a second frequency range between 600 MHz and 1800 MHz and which is higher than the first downlink band, as the first downlink signal.

For example, the first downlink (DL) band may have a frequency range between 850 MHz and 900 MHz. The second downlink (DL) band may have a frequency range between 900 MHz and 1000 MHz.

According to an embodiment, the wireless communication circuit 400 may be configured to receive at least one frequency selected from a third downlink (DL) band, a fourth downlink (DL) band that is higher than the third downlink (DL) band, or a fifth downlink (DL) band that is higher than the fourth downlink (DL) band, as the second downlink (DL) signal. The third downlink (DL) band, the fourth downlink (DL) band, and the fifth downlink (DL) band may have frequency ranges selected from predetermined frequencies.

For example, the third downlink (DL) band may have a frequency range between 1800 MHz and 1900 MHz. The fourth downlink (DL) band may have a frequency range between 2100 MHz and 2200 MHz. The fifth downlink (DL) band may have a frequency range between 2600 MHz and 2700 MHz.

Figure 6B:
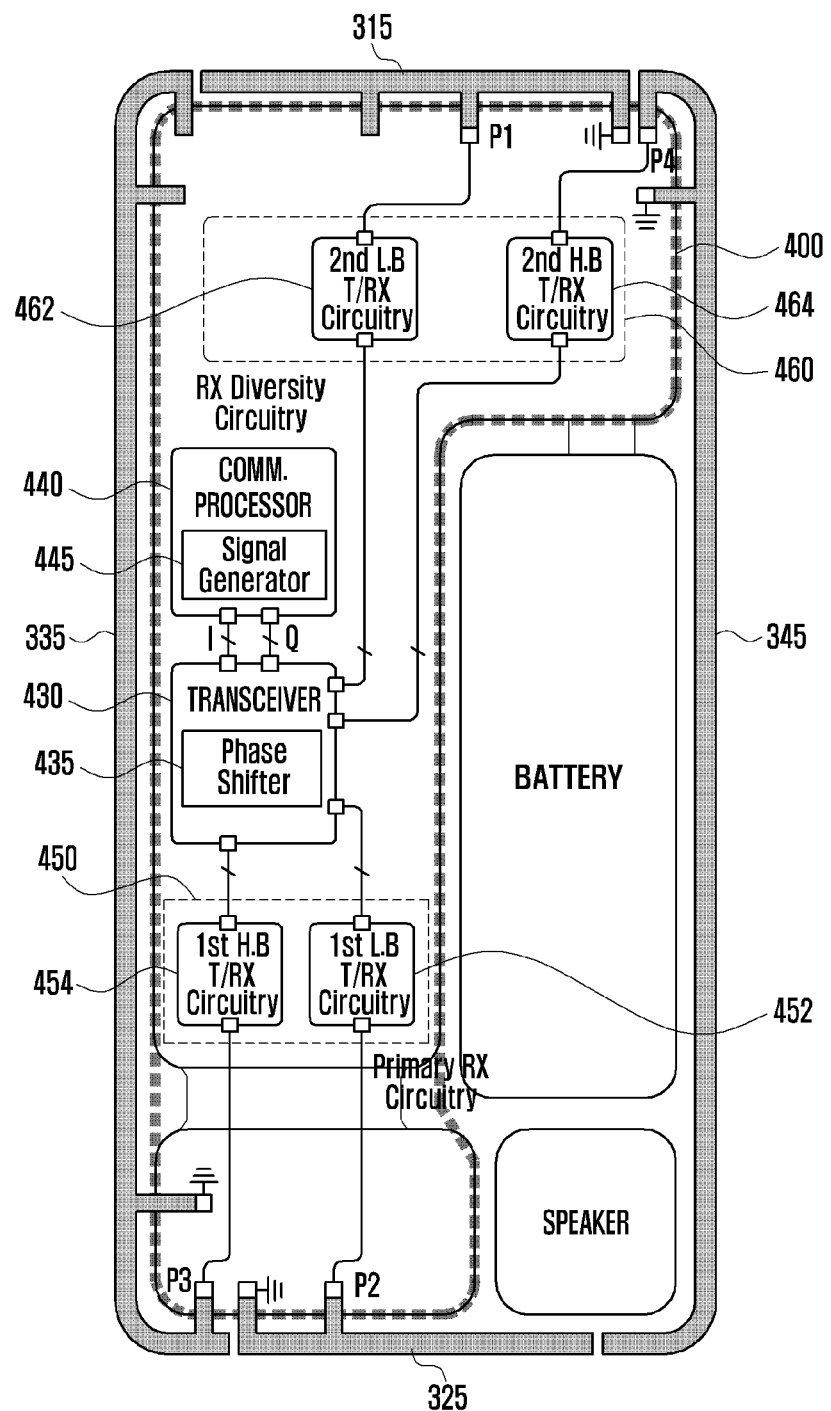
FIG. 6B is a view illustrating an operation of a two-band uplink carrier aggregation (CA) through the configurations of FIG. 6A.

FIG. 6B is a view illustrating an operation of a two-band uplink carrier aggregation (CA) through the configurations of FIG. 6A.

Hereinafter, because the configuration of the side member 300 of FIG. 6B is the same as the configuration of the side member 300 described in FIG. 6A, a detailed description thereof will not be repeated.

Referring to FIG. 6B, the wireless communication circuit 400 may include a primary transmission circuit 450, a transmission diversity circuit 460, a transceiver 430, and/or a communication processor 440. The primary transmission circuit 450 may include a first low band transmission/reception circuit 452 and/or a first high band transmission/reception circuit 454. The transmission diversity circuit 460 may include a second low band transmission/reception circuit 462 and/or a second high band transmission/reception circuit 464.

The first low band transmission/reception circuit 452 may be connected to the second point P2 of the second conductive portion 325 and the transceiver 430. The second low band transmission/reception circuit 462 may be connected to the transceiver 430 and the first point P1 of the first conductive portion 315. The first high band transmission/ reception circuit 454 may be connected to the third point P3 of the third conductive portion 335 and the transceiver 430.

The second high band transmission/reception circuit 464 may be connected to the transceiver 430 and the fourth point P4 of the fourth conductive portion 345.

The wireless communication circuit 400 may transmit a third uplink (UL) signal (e.g., B5 or B8) through the first point P1 of the first conductive portion 315 or the second point P2 of the second conductive portion 325 to support an uplink carrier aggregation (CA). The wireless communication circuit 400 may transmit a fourth uplink (UL) signal (e.g., B1, B3 or B7) having a frequency that is higher than the frequency of the third uplink (UL) signal through the third point P3 of the third conductive portion 335 or the fourth point of the fourth conductive portion 345. According to an embodiment, the third uplink signal may include at least one uplink signal. The fourth uplink signal may include at least one uplink signal.

The at least one third downlink (UL) signal may have at least one frequency selected from the first uplink (UL) band or a second uplink (UL) that is higher than the first uplink (UL) band. The first uplink (UL) band and the second uplink (UL) band may have a frequency range selected from the frequencies between 600 MHz and 1800 MHz.

The at least one fourth uplink (UL) signal may have a third uplink (UL) band, a fourth uplink (UL) band that is higher than the third uplink (UL) band, and a fifth uplink (UL) band that is higher than the fourth uplink (UL) band. The third to fifth uplink (UL) bands may have a frequency range selected from the frequencies between 1500 MHz and 2700 MHz.

According to an embodiment, the wireless communication circuit 400 of FIGS. 6A and 6B may support transmission (Tx) diversity. The wireless communication circuit 400 may be configured to transmit a fifth signal through the first point P1 and the second point P2 to support transmission (Tx) diversity. The wireless communication circuit 400 may be configured to transmit a sixth signal, which has a frequency that is higher than the frequency of the fifth signal, through the third point P3 and the fourth point P4 to support transmission (Tx) diversity. The wireless communication circuit 400 may support beam forming. In order that the wireless communication circuit 400 may support beam forming, the first point P1 may transmit the fifth signal having a first phase, and the second point P2 may transmit the fifth signal having a second phase. In order that the wireless communication circuit 400 may support beam forming, the third point P3 may transmit the sixth signal having a third phase having a frequency that is higher than the frequency of the fifth signal, and the fourth point P4 may transmit the sixth signal having a fourth signal.

According to an embodiment, the wireless communication circuit 400 of FIG. 6B may control a beam forming angle by controlling the phases of a signal of the primary transmission circuit 450 and a signal of the transmission diversity circuit 460. For example, the communication processor 440 of the wireless communication circuit 400 may include a signal generator 445. The signal generator 445 may control a phase in a digital scheme. The communication processor 440 may add a delay time when an input and/or an output (e.g., modulation) signal is generated through the signal generator 445, and may control the phases of the signal of the primary transmission circuit 450 and/or the signal of the transmission diversity circuit 460 output through the transceiver 430 in a digital scheme. As another example, the transceiver 430 of the wireless communication circuit 400 may include a phase shifter 435. The phase shifter 435 may control a phase in an analog scheme. The communication processor 440 may control the phases of the signal of the primary transmission circuit 450 and/or the signal of the transmission diversity circuit 460 output through the transceiver 430 in an analog scheme by using the phase shifter 435.

Figure 7A:
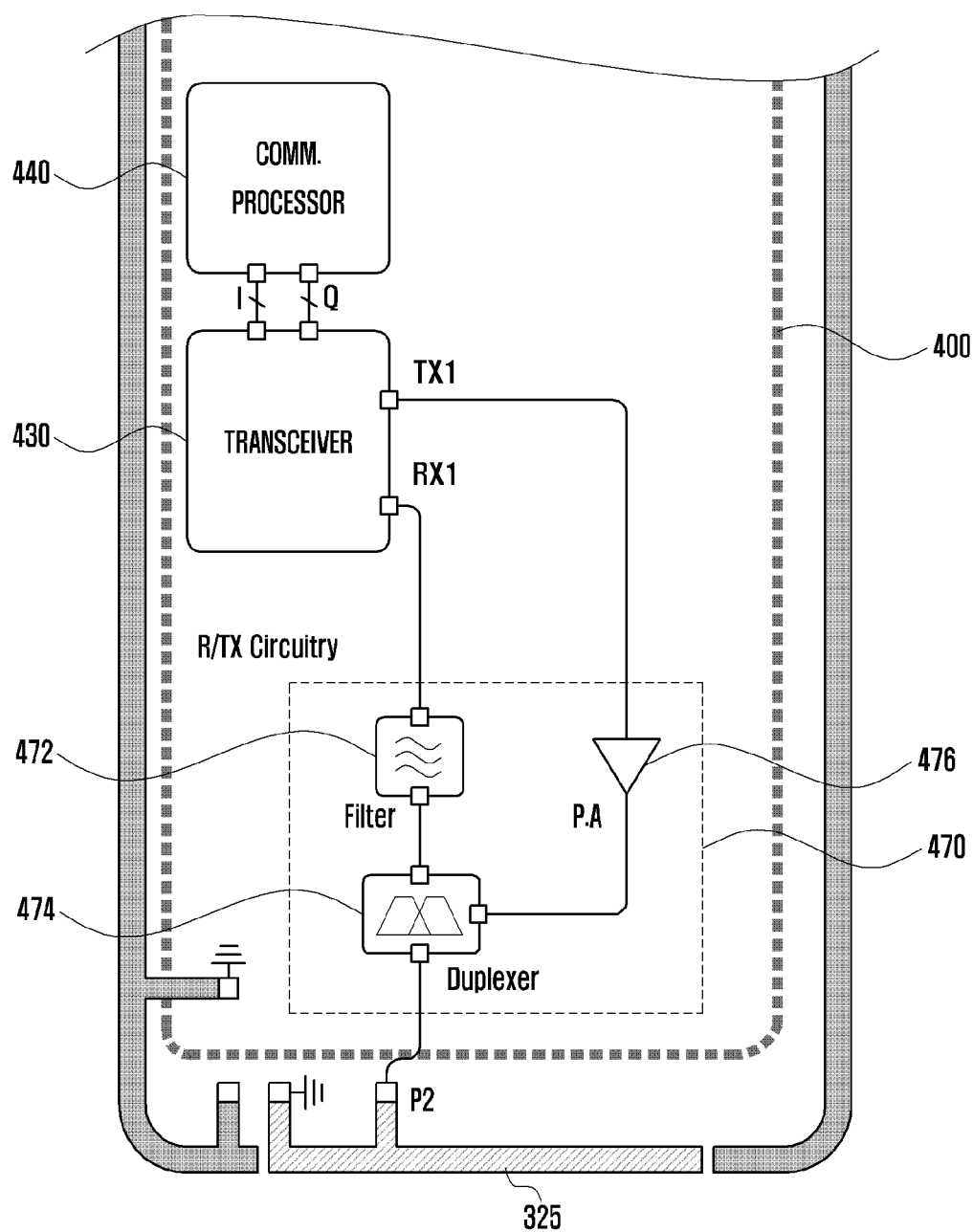
FIG. 7A is a view illustrating another configuration of a wireless communication circuit of an electronic device according to various embodiments of the disclosure.
Figure 7B:
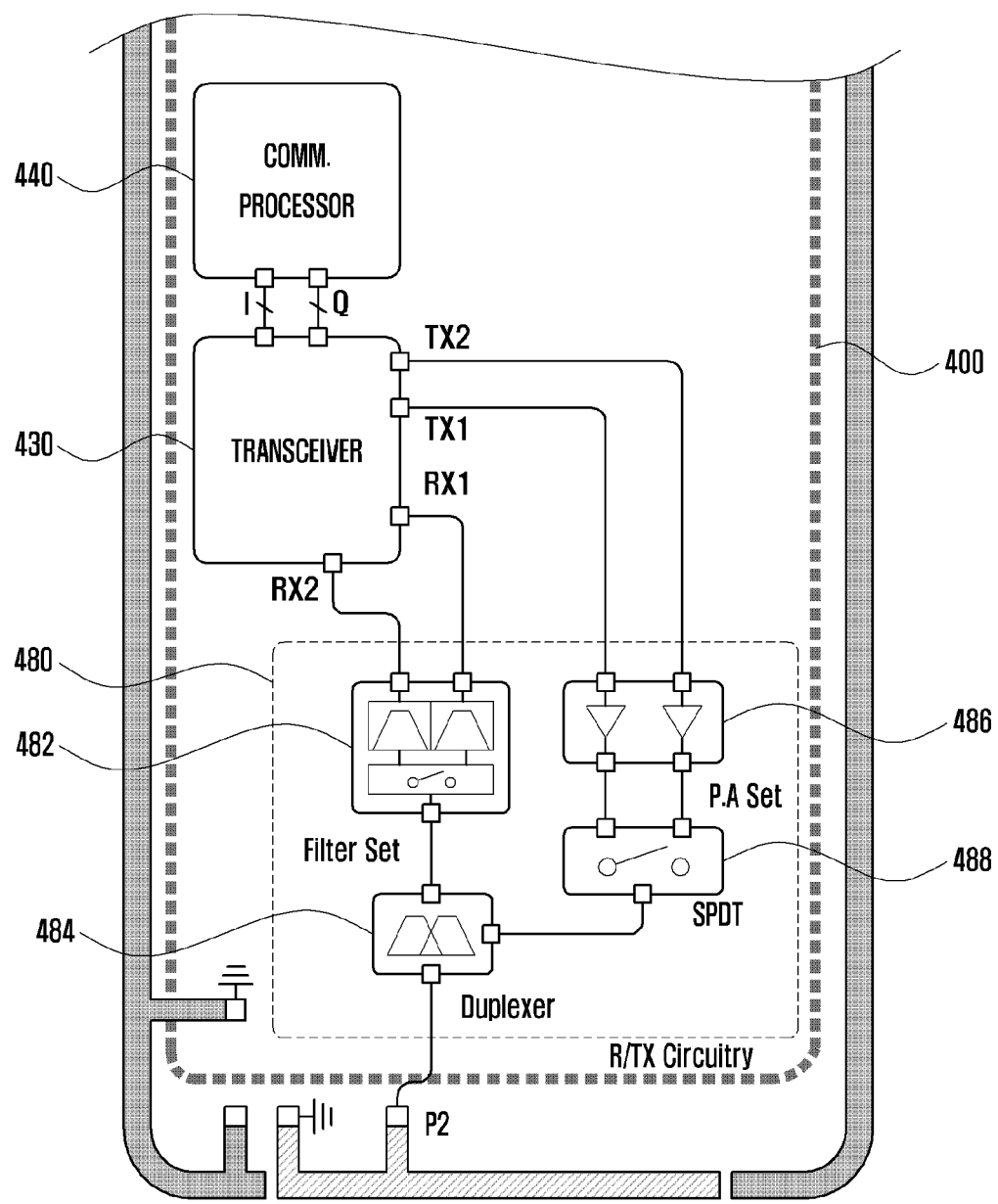
FIG. 7B is a view illustrating another configuration of a wireless communication circuit of an electronic device according to various embodiments of the disclosure.

FIG. 7A is a view illustrating another configuration of a wireless communication circuit of an electronic device according to various embodiments of the disclosure. FIG. 7B is a view illustrating another configuration of a wireless communication circuit of an electronic device according to various embodiments of the disclosure.

Referring to FIG. 7A, a wireless communication circuit 400 according to various embodiments of the disclosure may include a first transmission/reception circuit 470. The first transmission/reception circuit 470 may support a single band (e.g., B5 (an uplink: about 824 MHz to 849 MHz, a downlink: about 869 MHz to 894 MHz).

The first transmission/reception circuit 470 may include a filter 472, a duplexer 474, and/or a power amplifier 476. The filter 472 may include a band pass filter (BPF). One end of the filter 472 may be connected to a first reception terminal RX1 of the transceiver 430, and an opposite end of the filter 472 may be connected to the duplexer 474. The duplexer 474 may be connected to the second point P2 of the second conductive portion 325. One end of the power amplifier 476 may be connected to a first transmission terminal TX1 of the transceiver 430, and an opposite end of the power amplifier 476 may be connected to the duplexer 474.

Referring to FIG. 7B, the wireless communication circuit 400 according to various embodiments of the disclosure may include a second transmission/reception circuit 480. The second transmission/reception circuit 480 may support a dual band (e.g., B5 (an uplink: about 824 MHz to 849 MHz, a downlink: about 869 MHz to 894 MHz), and B8 (an uplink: 880 MHz to 915 MHz, a downlink: about 925 MHz to 960 MHz).

The second transmission/reception circuit 480 may include a filter set 482, a duplexer 484, a power amplifier 486, and/or a switch 488 (e.g., a single pole double throw (SPDT)). The filter set 482 may include a band pass filter (BPF). One end of the filter set 482 may be connected to the first reception terminal RX1 and the second reception terminal RX2 of the transceiver 430. One end of the duplexer 484 may be connected to the filter set 482, and an opposite end of the duplexer 484 may be connected to the second point P2 of the second conductive portion 325. The power amplifier set 486 may be connected to the first transmission terminal TX1 and the second transmission terminal TX2 of the transceiver 430. One end of the switch 488 may be connected to the power amplifier set 486, and an opposite end of the switch 488 may be connected to the duplexer 484.

According to an embodiment, the filter 472, the duplexer 474, and/or the power amplifier 476 of the first transmission/reception circuit 470 and the filter set 482, the duplexer 484, the power amplifier 486, and/or the switch 488 of the second transmission/reception circuit 480 of the wireless communication circuit 400 may be replaced by other elements or other elements may be added. A diplexer, a quadplexer, a hexaplexer, a low-noise amplifier, a dual pole double throw (DPDT), an SP3T, or an SP4T may replace the elements of the wireless communication circuit 400, such as the first transmission/reception circuit 470 and the second transmission/reception circuit 480, or may be added.

Figure 8A:
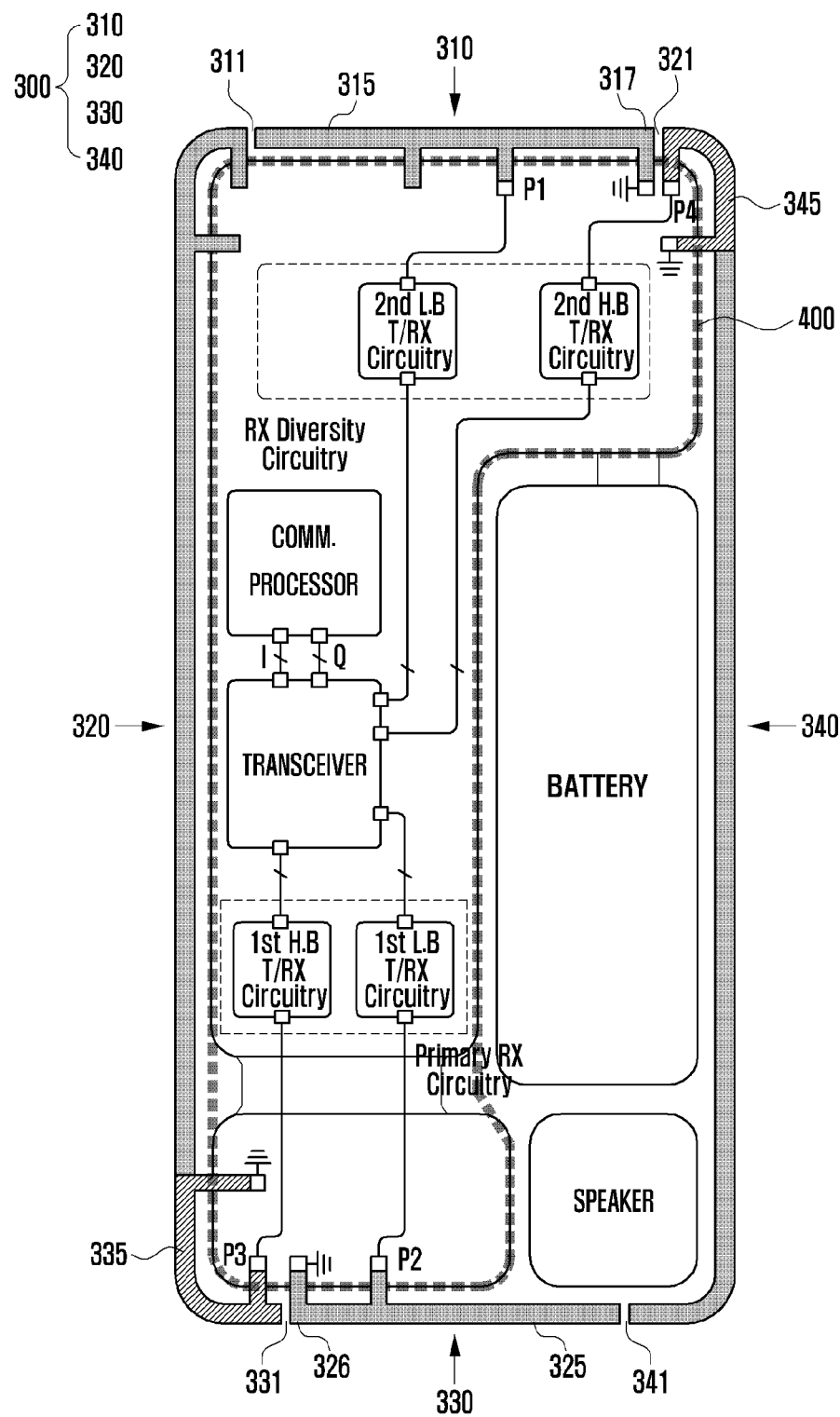
FIG. 8A is a view illustrating a configuration for supporting a transmission (Tx) diversity of an electronic device according to various embodiments of the disclosure.
Figure 8B:
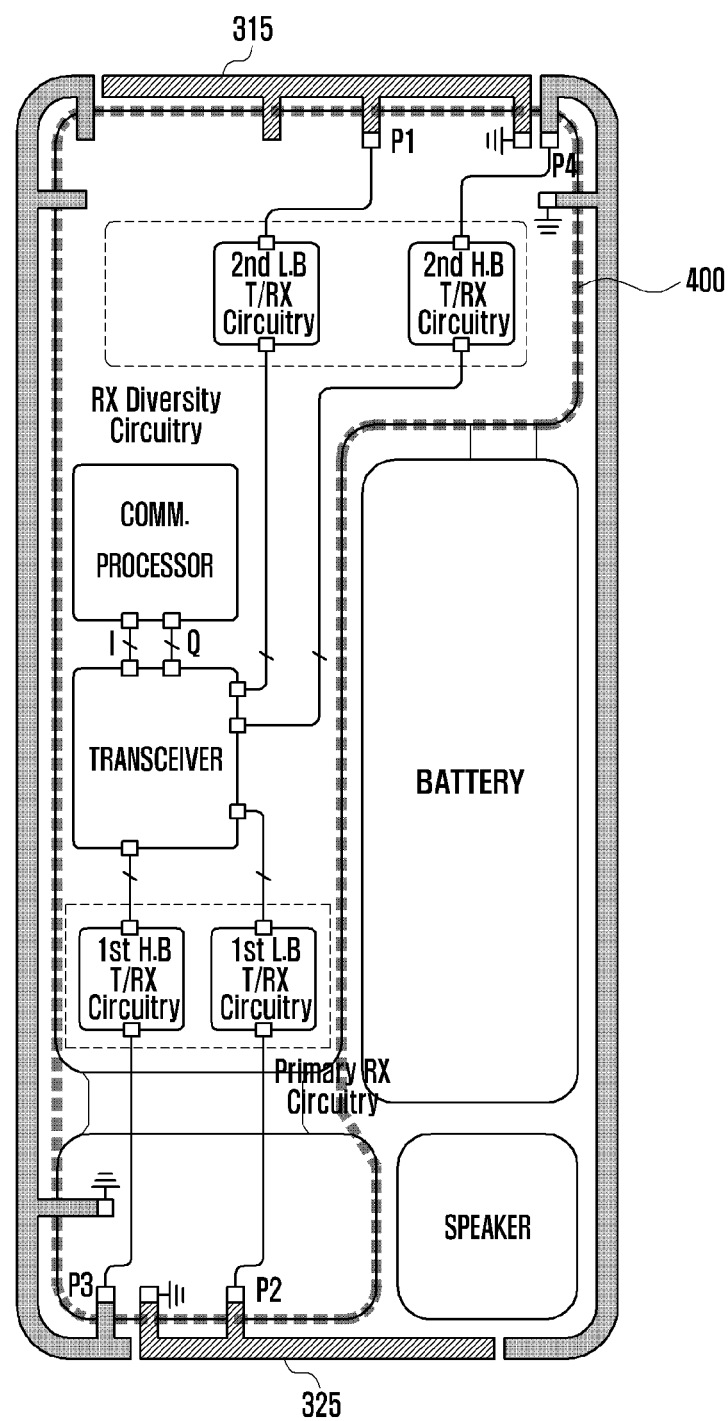
FIG. 8B is a view illustrating a configuration for supporting an uplink carrier aggregation (UL CA) of an electronic device according to various embodiments of the disclosure.

FIG. 8A is a view illustrating a configuration for supporting a transmission (Tx) diversity of an electronic device according to various embodiments of the disclosure. FIG. 8B is a view illustrating a configuration for supporting an uplink carrier aggregation (UL CA) of an electronic device according to various embodiments of the disclosure.

In the description of FIGS. 8A and 8B, a detailed description of the same elements of FIGS. 6A and 6B will be omitted. The first conductive portion 315, the second conductive portion 325, the third conductive portion 335, and the fourth conductive portion 345 described in FIGS. 6A and 6B will be denoted by the same reference numerals. The first conductive portion 315, the second conductive portion 325, the third conductive portion 335, and the fourth conductive portion 345 may be a first antenna element, a second antenna element, a third antenna element, and a fourth antenna element.

Referring to FIGS. 8A and 8B, the electronic device 200 according to various embodiments of the disclosure may include a first conductive portion 315, a second conductive portion 325, a third conductive portion 335, a fourth conductive portion 345, and/or a wireless communication circuit 400.

The first conductive portion 315 may correspond to the first conductive portion 315 illustrated in FIG. 6A. The first conductive portion 315 may be defined by the first peripheral portion 310 (e.g., the first portion) of the side member 300.

The second conductive portion 325 may correspond to the second conductive portion 325 illustrated in FIG. 6A. The second conductive portion 325 may be defined by the third peripheral portion 330 (e.g., the second portion) of the side member 300.

The third conductive portion 335 may correspond to the third conductive portion 335 illustrated in FIG. 6A. The third conductive portion 335 may be defined by the second peripheral portion 320 (e.g., the third portion) of the side member 300.

The fourth conductive portion 345 may correspond to the fourth conductive portion 345 illustrated in FIG. 6A. The fourth conductive portion 345 may be defined by the fourth peripheral portion 340 (e.g., the fourth portion) of the side member 300.

A first point P1 may be disposed at a predetermined portion of the first conductive portion 315. A second point P2 may be disposed at a predetermined portion of the second conductive portion 325. A third point P3 may be disposed at a predetermined portion (e.g., a portion that is adjacent to the third nonconductive portion) of the third conductive portion 335. A fourth point P4 may be disposed at a predetermined portion (e.g., a portion that is adjacent to the second nonconductive portion 321) of the fourth conductive portion 345.

The wireless communication circuit 400 may be electrically connected to the first point P1 in the first conductive portion 315, the second point P2 in the second conductive portion 325, the third point P3 in the third conductive portion 335, and/or the fourth point P4 in the fourth conductive portion 345.

According to an embodiment, a feeder may be disposed at a first point P1 of the first conductive portion 315. A second end 327 of the first conductive portion 315 may be connected to the ground. A feeder may be disposed at a second point P2 of the second conductive portion 325. A first end 326 of the second conductive portion 325 may be connected to the ground.

According to an embodiment, a feeder may be disposed at a third point P3 of the third conductive portion 335. At least one point of the third conductive portion 335 may be connected to the ground. A feeder may be disposed at a fourth point P4 of the fourth conductive portion 345. At least one point of the fourth conductive portion 345 may be connected to the ground.

Referring to FIG. 8A, the wireless communication circuit 400 may transmit primary component carriers (PCCs) through the third conductive portion 335 and the fourth conductive portion 345 that diagonally faces the third conductive portion 335 to support the transmission (TX) diversity. The primary component carrier signal may be a first frequency band.

According to an embodiment, the third point P3, at which a feeder of the third conductive portion 335 is disposed, may be determined to diagonally face the fourth point P4, at which a feeder of the fourth conductive portion 345 is disposed.

According to an embodiment, the side member 300 may include at least one first corner on one side of the first peripheral portion 310. The side member 300 may include at least one second corner on one side of the third peripheral portion 330. The second corner may be disposed on a side that is diagonally opposite to the first corner when viewed from the first corner and the upper side of the touchscreen display (e.g., the touchscreen display 201 of FIG. 2) exposed to the outside. The side member 300 may have a substantially rectangular shape when viewed from the upper side.

According to an embodiment, the first peripheral portion 310 (e.g., the first portion) may be located in an adjacent area of the first corner, and the second peripheral portion 320 (e.g., the second portion) may be located in an adjacent area of the second corner. For example, referring to FIG. 8A, the adjacent area of the first corner may include an area from the first nonconductive portion 311 disposed on one side of the first conductive portion 315 to a portion of an upper end of the second peripheral portion 320. The adjacent area of the second corner may include an area from the fourth nonconductive portion 341 disposed on one side of the second conductive portion 325 to a portion of a lower end of the fourth peripheral portion 340.

Referring to FIG. 8B, the wireless communication circuit 400 may transmit secondary component carrier (SCC) signals through the first conductive portion 315 and/or the second conductive portion 325 that is opposite to the first conductive portion 315 to support an uplink carrier aggregation (UL CA). The secondary component carrier signal may be a second frequency band.

According to an embodiment, the first point P1, at which a feeder of the first conductive portion 315 is disposed, may be determined to face the second point P2, at which a feeder of the second conductive portion 325 is disposed, in an opposite direction.

According to an embodiment, the wireless communication circuit 400 may receive a downlink (DL) signal through the third conductive portion 335. The wireless communication circuit 400 may transmit a first signal of the primary component carrier through the third conductive portion 335. The wireless communication circuit 400 may transmit a second signal of the primary component carrier through the fourth conductive portion 345, to support transmission (Tx) diversity, together with the first signal of the primary component carrier. The wireless communication circuit 400 may transmit an unlink carrier aggregation (UL CA) through the first conductive portion 315.

According to an embodiment, the third conductive portion 335 may be operated as a transmission (TX) antenna that transmits a first signal of the primary component carrier. The first conductive portion 315 may be operated as a transmission (TX) antenna that transmits a secondary component carrier signal. The third conductive portion 335 and the first conductive portion 315 may be disposed to be adjacent to each other through the first nonconductive portion 311. In order to secure an isolation performance between the third conductive portion 335 and the first conductive portion 315, a ground may be located between the third point P3, at which the feeder of the third conductive portion 335 is disposed, and the first point P1, at which the feeder of the first conductive portion 315 is disposed.

According to an embodiment, the wireless communication circuit 400 may perform a control such that the third conductive portion 335 and the first conductive portion 315 transmit different signals. For example, the wireless communication circuit 400 may perform a control such that the first conductive portion 315 transmit a low band frequency signal (e.g., B5 (an uplink: about 824 MHz to 849 MHz, a downlink: about 869 MHz to 894 MHz)) when the third conductive portion 335 transmits a high band frequency signal (e.g., B1 (an uplink: about 1920 MHz to 1980 MHz, a downlink: about 2110 MHz to 2170 MHz)).

According to an embodiment, the fourth conductive portion 345 may be operated as a transmission (TX) antenna that transmits a second signal of the primary component carrier (PCC). The second conductive portion 325 may be operated as a transmission (TX) antenna that transmits a primary component carrier signal. The fourth conductive portion 345 and the second conductive portion 325 may be disposed to be adjacent to each other through the fourth nonconductive portion 341. In order to secure an isolation performance between the fourth conductive portion 345 and the second conductive portion 325, a ground may be located between the fourth point P4, at which the feeder of the fourth conductive portion 345 is disposed, and the second point P2, at which the feeder of the second conductive portion 325 is disposed.

According to an embodiment, the wireless communication circuit 400 may perform a control such that the fourth conductive portion 345 and the second conductive portion 325 transmit different signals. For example, the wireless communication circuit 400 may perform a control such that the second conductive portion 325 transmit a low band frequency signal (e.g., B5 (an uplink: about 824 MHz to 849 MHz, a downlink: about 869 MHz to 894 MHz)) when the fourth conductive portion 345 transmits a high band frequency signal (e.g., B1 (an uplink: about 1920 MHz to 1980 MHz, a downlink: about 2110 MHz to 2170 MHz)).

Figure 9:
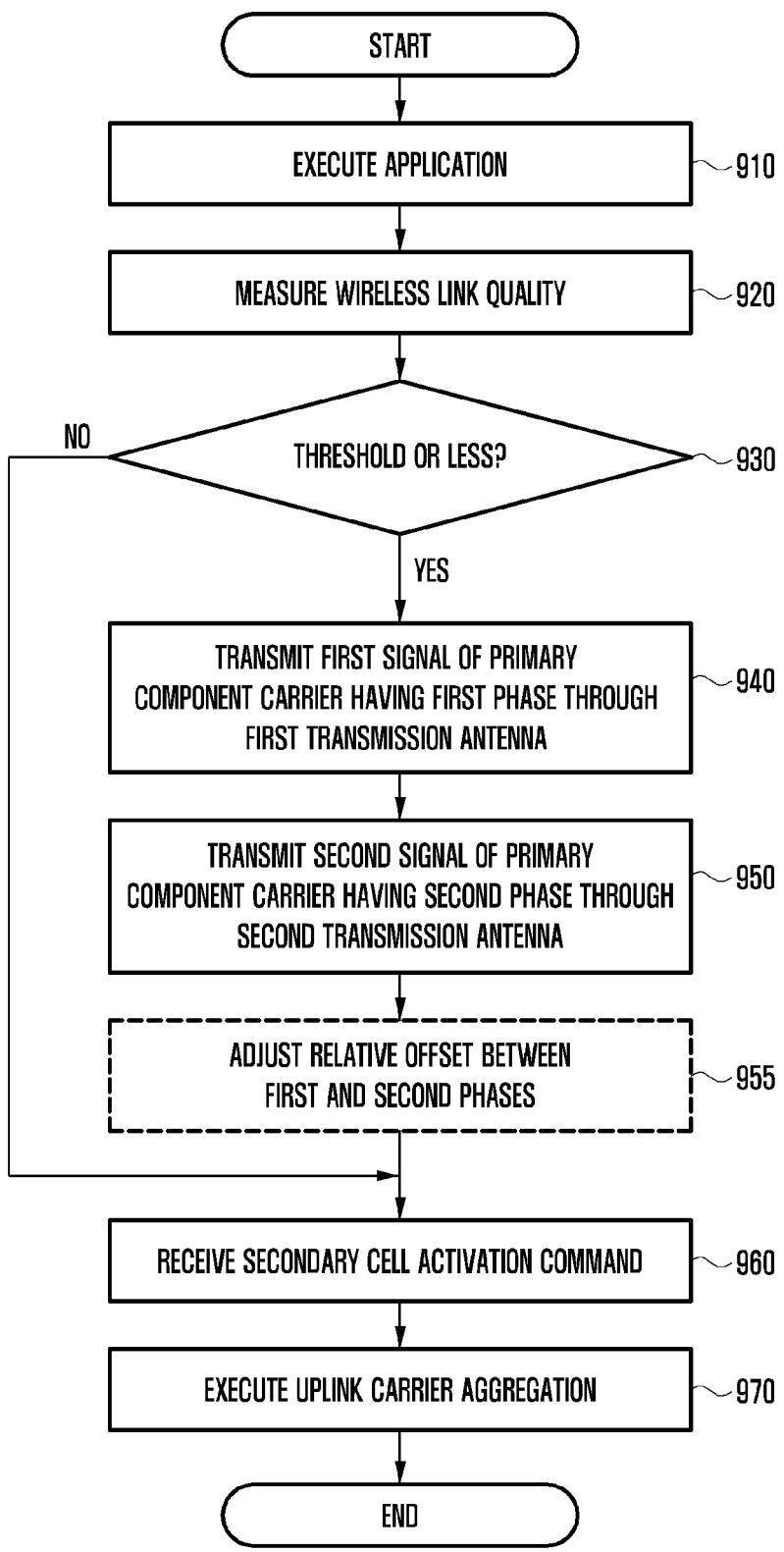
FIG. 9 is a flowchart illustrating an embodiment of a method for controlling wireless communication by using an electronic device according to various embodiments of the disclosure.

FIG. 9 is a flowchart illustrating an embodiment of a method for controlling wireless communication by using an electronic device according to various embodiments of the disclosure;

Referring to FIG. 9, the power consumption of the electronic device can be reduced by adjusting the occurrence frequencies of the operations of the carrier aggregation (CA) and the transmission (TX) diversity when the wireless communication circuit 400 of the electronic device 200 performs the operations of the carrier aggregation (CA) and the transmission (TX) diversity.

The electronic device 200 may designate the state in which the electronic device 200 is connected (radio resource control (RRC)-connected) to a network (e.g., the network 199 of FIG. 1) as a basic operation state.

In operation 910, the electronic device 200 (e.g., the processor 120 of FIG. 1) may execute an application such as a video call, a cloud, and/or an SNS service.

The state of the electronic device 200 may be converted from an RRC-connection state to an RRC-idle state according to an operation of the user such as termination of an application. In the RRC-idle state, the electronic device 200 may not transmit the corresponding application data to the network before execution of the application.

Various scenario situations may occur in the electronic device 200 according to the use of the user. In the application such as a video call and/or a cloud executed by the user of the electronic device 200, an uploading data stream may frequently occur. For example, according to data processing of the electronic device 200, a downlink carrier aggregation (DL CA) and an uplink carrier aggregation (UL CA) may occur between the electronic device 200 and the network (e.g., a base station) through wireless communication. The user of the electronic device 200 may move by using a high-speed vehicle while using an application, or may move in a wireless shading area. In the wireless shading area, the degradation of the quality of the wireless link, such as the weakening of the intensity of the wireless communication signal or the wireless fading phenomenon, in which the intensity of the wireless communication signal varies over time, may occur.

In the RRC-connection state, for example, the electronic device 200 may be connected to the primary cell of the external device (e.g., a base station) through a wireless link. In this case, the electronic device 200 may transmit a primary component carrier (PCC) signal having a default phase through the first transmission (TX) antenna (e.g., the third conductive portion 335 of FIG. 6B or the third conductive portion 335 of FIG. 8A). The primary component carrier signal may include basic control information such as channel information and an uploading application. For example, the first transmission (TX) antenna may be the same or may not be the same as the first reception (RX) antenna (e.g., the fourth conductive portion 345 of FIG. 6B or the fourth conductive portion 345 of FIG. 87A) among the plurality of reception (RX) antennas. The primary component carrier signal may include an LTE B1 band (an uplink: 1920 MHz to 19870 MHz, a downlink: 2110 MHz to 2170 MHz) signal.

In operation 920, the electronic device 200 (e.g., the processor 120 of FIG. 1) may measure a wireless link quality (e.g., an RSRP, an RSRQ, an SINR, or an RSSI) related to the primary cell of the base station.

According to an embodiment, the electronic device 200 may include a processor (e.g., the processor 120 of FIG. 1) and a wireless communication circuit 400. The wireless communication circuit 400 may include a communication processor 440 or another processor (e.g., the application processor 443 of FIG. 12).

According to an embodiment, the communication processor 440 of the electronic device 200 may measure the wireless link quality value of a primary cell signal of a base station, which has been received through the first to fourth conductive portions 315 to 345 of the side member 300 and/or the wireless communication circuit 400.

The reference signal received power (RSRP) may be the intensity of power of a reference signal received by the electronic device 200. The reference signal received quality (RSRQ) may be the ratio of power of a reference signal received by the electronic device 200. The signal-to-interference & noise ratio (SINR) may be a noise ratio for the reference signal of a serving cell. The received signal strength indication (RSSI) may be a total strength of the power received by the electronic device 300, and may be an interference and/or noise of an adjacent channel.

In operation 930, the electronic device 200 (e.g., the processor 120 of FIG. 1) may compare the wireless link quality value measured in operation 920 and a threshold value (e.g., a reference value) stored in a memory (e.g., the memory 130 of FIG. 1) of the electronic device 200.

In operation 940, when the wireless link quality measured in operation 920 is not more than the stored threshold value, the electronic device 200 (e.g., the processor 120 of FIG. 1) may transmit a first signal of a primary component carrier having a first phase (e.g., 0°) that is a default phase, through the first transmission (TX) antenna (e.g., the third conductive portion 335 of FIG. 6B or the third conductive portion 335 of FIG. 8A).

According to an embodiment, the primary component carrier signal (e.g., the B1 signal) may be a frequency signal corresponding to the primary cell of the base station. The first transmission (TX) antenna may be an antenna set to the primary component carrier. At least one of the plurality of reception (RX) antennas may include a first transmission antenna, a second transmission antenna, a third transmission antenna, and/or a fourth transmission antenna.

According to an embodiment, when a signal is transmitted through the first transmission (TX) antenna (e.g., the third conductive portion 335 of FIG. 6B or the third conductive portion 335 of FIG. 8B), for example, a primary transmission (TX) signal having a default phase of the B1 band carrier may be transmitted and the diversity transmission (TX) signal may not be present.

According to an embodiment, when the wireless link quality value is lowered to a threshold value or less, the base station may control the electronic device 200 to maintain a wireless link connection state or a specific wireless link quality. When the wireless link quality value is lowered to the threshold value or less after the wireless link quality value measured in operation 1020 and the threshold value set in the electronic device 200 are compared, a stable wireless link connection state and a wireless link quality can be secured to transmit the diversity transmission (TX) signal. For example, when a target transmission (TX) power is raised to 18 dBm or more as the wireless link quality such as the RSRP of the electronic device 200 is lowered, the electronic device 200 may activate the diversity transmission (TX) signal. For example, when the threshold value for activating the diversity transmission (TX) signal is set to a value that is lower than the threshold value set in an LTE measuring event, a situation such as a handover may occur before the diversity transmission (TX) signal is activated. Accordingly, the threshold value for activating the diversity transmission (TX) signal may be the same as or higher than the threshold value set in the LTE measuring event (e.g., events A1 to C6).

In operation 950, when the wireless link quality is not more than the threshold value, the electronic device 200 (e.g., the processor 120 of FIG. 1) may transmit a second signal of the primary component carrier (PCC) having a second phase (e.g., 0°) that is a default phase, through the second transmission (TX) antenna (e.g., the fourth conductive portion 345 of FIG. 6B or the fourth conductive portion 345 of FIG. 8A).

According to an embodiment, the first signal of the primary component carrier transmitted through the first transmission (TX) antenna is a carrier signal that uses the same band as the second signal of the primary component carrier having a different phase, which has been transmitted through the second transmission (TX) antenna, and may be a signal having the same information and data.

According to an embodiment, the electronic device 200 may be configured to adjust the output level of a corresponding signal such that the first signal and the second signal have different phases. Through this, the electronic device 200 may perform an efficient transmission power control by reducing an unnecessary current consumption while satisfying target power.

In operation 960, the electronic device 200 (e.g., the processor 120 of FIG. 1) may receive a command for activating a secondary cell from the base station by using the wireless communication circuit 400. According to an embodiment, the electronic device 200 may execute operation 960 when the measured wireless link quality is a preset threshold value or more in the comparison result of operation 930.

According to an embodiment, an operation of receiving the secondary cell activation command by the electronic device 200 may be accompanied by a complex control information exchange process (e.g., a carrier aggregation setup process) between the base station and the electronic device 200. For example, the operation of executing the uplink carrier aggregation (UL CA) may be accompanied by the process of executing the downlink aggregation (DL CA). That is, the process of executing the uplink carrier aggregation (UL CA) through the first transmission (TX) antenna and/or the second transmission (TX) antenna may include a process of executing the downlink aggregation (DL CA) through the first reception (RX) antenna and/or the second reception (RX) antenna. In this case, the first transmission (TX) antenna and the first reception (RX) antenna, and/or the second transmission (TX) antenna and the second reception (RX) antenna may be the same or may not be the same. In the electronic device 200 according to various embodiments of the disclosure, the antennas that perform the uplink carrier aggregation (UL CA) and the downlink aggregation (DL CA) may be the same.

In operation 960, the electronic device 200 (e.g., the processor 120 of FIG. 1) may be configured to execute the uplink carrier aggregation (UL CA) on the basis of the reception of the activation command. That is, the electronic device 200 may transmit a secondary component carrier signal through the third transmission antenna (e.g., the first conductive portion 315 of FIG. 6B or the first conductive portion 315 of FIG. 8A) and the fourth transmission antenna (e.g., the second conductive portion 325 of FIG. 6B or the second conductive portion 325 of FIG. 8A). The state of the electronic device 200 may be converted to an RRC-idle state according to an operation of the user such as termination of an application after the electronic device 200 transmits the secondary component carrier signal.

According to an embodiment, a data throughput, by which data may be uploaded through a wireless link between the electronic device 200 and the base station, may be restricted by a 3GPP standard. For example, the size of a resource block (RB) for a communication channel of the electronic device 200 may be defined, and may exceed the size of a maximum resource block (RB) when big data are uploaded. When a data throughput that exceeds the size of the maximum resource block RB occurs, the electronic device 300 may execute the uplink carrier aggregation (UL CA). In this case, the electronic device 200 may transmit a secondary component carrier signal through the third transmission antenna (e.g., the first conductive portion 315 of FIG. 6B or the first conductive portion 315 of FIG. 8A) and/or the fourth transmission antenna (e.g., the second conductive portion 325 of FIG. 6B or the second conductive portion 325 of FIG. 8A), except for the diversity transmission antenna. The secondary component carrier signal may be a secondary cell signal having a frequency band that is different from the frequency band of the primary component carrier signal. For example, the primary component carrier signal may be a B1 (an uplink: about 1920 MHz to 1980 MHz, a downlink: about 2110 MHz to 2170 MHz) signal, and the secondary component carrier signal may be a B5 (an uplink: about 824 MHz to 849 MHz, a downlink: about 869 MHz to 894 MHz).

According to an embodiment, the electronic device 200 may transmit a signal of a predetermined band (e.g., B5) through the third transmission antenna (e.g., the first conductive portion 315 of FIG. 6B or the first conductive portion 315 of FIG. 8A). The third transmission antenna may execute an uplink carrier aggregation (UL CA) together with a predetermined band (e.g., B1) through the first transmission (TX) antenna (e.g., the third conductive portion 335 of FIG. 6B or the third conductive portion 335 of FIG. 8A). For example, the upload bandwidth (BW) of the secondary component carrier transmission signal may be 10 MHz, and the upload bandwidth (BW) of the primary component carrier transmission signal may be 20 MHz. The data throughputs of the primary component carrier transmission signal and the secondary component carrier transmission signal per 10 MHz may be 30 Mbps. Accordingly, the single band uplink carrier aggregation (UL CA) uses the primary component carrier transmission signal (e.g., B5) having a bandwidth of 20 MHz, and the data throughput of the channel may be 60 Mbps in proportion to the bandwidth. The dual band uplink carrier aggregation (UL CA) may provide the data throughput of 90 Mbps by using the primary component carrier transmission signal and the secondary component carrier (SCC) transmission signal.

According to an embodiment, when the electronic device 200 uses a 64 QAM modulation and uses a bandwidth of 20 MHz, a data through put of about 75 Mbps may be shown. A maximum data throughput of about 112 Mbps may be provided through the secondary component carrier transmission signal having an upload bandwidth of 10 MHz and the primary component carrier transmission signal having an upload bandwidth of 20 MHz.

According to an embodiment, operation 950 and operation 960 may be executed simultaneously or separately. If the electronic device 200 executes the uplink carrier aggregation (UL CA), the wireless link quality can be enhanced. The electronic device 200 may use a network (e.g., a base station) to execute the uplink carrier aggregation (UL CA).

According to an embodiment, the electronic device 200 may execute the uplink carrier aggregation (UL CA) according to a secondary cell activation command of the base station, in addition to a request for uploading big data by the user. The setup processing of the uplink carrier aggregation (UL CA), that is, the activation/deactivation of the secondary cell may be executed mainly by a media access control (MAC)/radio resource control (RRC) layer among the LTE physical layers. Mainly, the radio resource control (RRC) may perform a search for a secondary cell and an additional function, and the media access control (MAC) may perform a data resource scheduling function, such as activation/deactivation of the secondary cell. Accordingly, when the data throughput may be increased by a request for uploading data of the user of another electronic device (e.g., the electronic device 102, 104, or 108 of FIG. 1) in the primary cell of the base station and the processing capacity of the primary component carrier band is saturated, the electronic device 200 may execute an uplink carrier aggregation (UL CA) through the secondary component carrier band.

According to an embodiment, when the signal quality of the primary component carrier band is lowered by the conditions of LTE A1 to A6 and the signal quality of the secondary component carrier band is increased, the electronic device 200 may execute the uplink carrier aggregation (UL CA) through the secondary component carrier band.

According to an embodiment, after determining whether values for the secondary cell activation buffer, the delay threshold, and/or the throughput exceed threshold values, the electronic device 200 may execute a secondary cell activation command when the values are within the preset threshold values.

According to another embodiment, operation 955 may be added between operation 950 and operation 960.

In operation 955, the electronic device 200 (the processor 120 of FIG. 1) may adjust a relative phase offset between a first phase and a second phase. Through operation 955, the electronic device 200 may determine a beam forming direction for at least one of the antenna elements (e.g., the first to fourth conductive portions 315 to 345 of FIG. 8A) of the electronic device 200 by controlling a relative phase offset between the primary transmission (TX) signal and the diversity transmission (TX) signal.

According to an embodiment, adjusting a relative phase offset between the first phase and the second phase means changing the beam pattern directions of the primary transmission (TX) signal and the diversity transmission (TX) signal to one base station, and thus, the antenna efficiency and the wireless link quality of the electronic device 200 can be enhanced.

According to various embodiments, the electronic device (e.g., a portable communication device) according to various embodiments of the disclosure may provide a method for operating a portable communication device for controlling wireless communication.

According to an embodiment, the electronic device 200 according to various embodiments of the disclosure may be configured to perform: an operation of measuring the quality of a wireless link established between the electronic device 200 and the primary cell of the base station; an operation of comparing the measured quality of the wireless link and a threshold value set in the memory (e.g., the memory 130 of FIG. 1) of the electronic device 200; an operation of transmitting a first signal of a first phase of the primary component carrier through the first conductive portion 315 included in the electronic device 200; an operation of, when the measured quality of the wireless link is the threshold value or less, transmitting a second signal having a second phase of the primary component carrier through the second conductive portion 325 included in the electronic device 200; and an operation of receiving a secondary cell activation command from the base station by the electronic device 200.

According to an embodiment, the electronic device 200 (e.g., the processor 120 of FIG. 1) may measure a wireless link quality (e.g., an RSRP, an RSRQ, an SINR, or an RSSI) related to the primary cell of the base station.

According to an embodiment, when the measured quality of the wireless link is the threshold value or more, the electronic device 200 may be configured to receive the secondary cell activation command from the base station.

According to an embodiment, the first signal of the primary component carrier, which has a first phase, may be controlled to have an uplink band of 1920 MHz to 1980 MHz and a downlink band of 2110 MHz to 2170 MHz.

According to an embodiment, the measurement operation may be configured to measure a wireless link quality value for the primary cell signal, which has been received through at least one of the first conductive portion 315, the second conductive portion 325, the third conductive portion 335, or the fourth conductive portion 345.

Figure 10A:
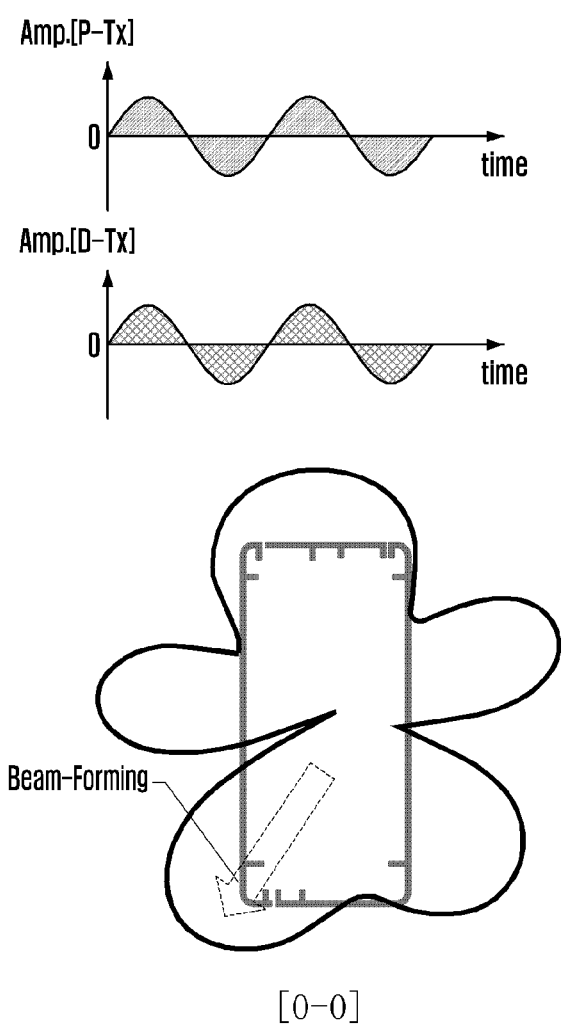
FIGS. 10A to 10C are views illustrating an operation of controlling the direction of beam forming by adjusting an offset by an electronic device according to various embodiments of the disclosure.
Figure 10B:
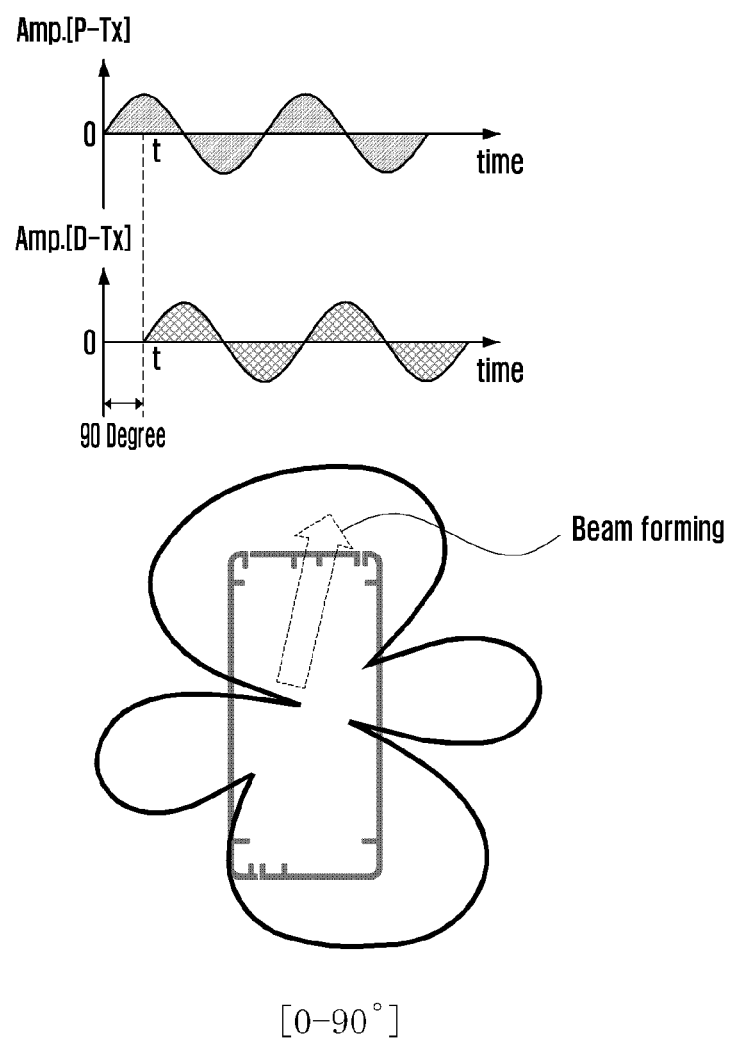
Figure 10C:
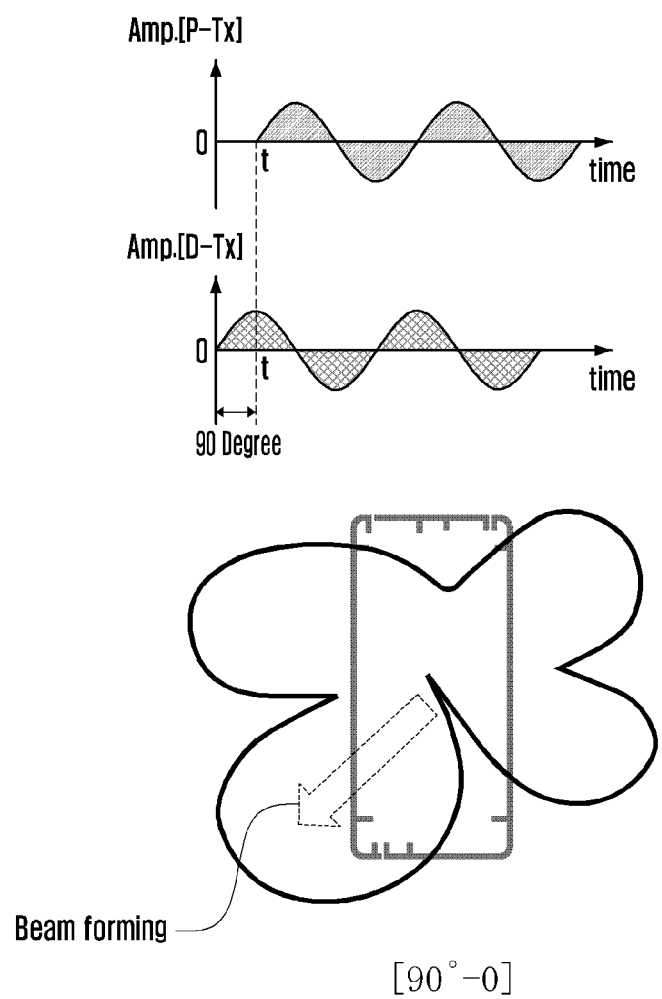

FIGS. 10A to 10C are views illustrating an operation of controlling the direction of beam forming by adjusting an offset by an electronic device according to various embodiments of the disclosure.

Referring to FIGS. 10A to 10C, the electronic device 200 may control the beam forming direction by the primary transmission (P-TX) antenna and the diversity (D-TX) antenna through a phase control between the primary transmission (P-TX) signal and the diversity transmission (D-TX) signal.

According to an embodiment, in FIGS. 10A to 10C, the direction of beam forming for the primary transmission (P-TX) antenna and the diversity (D-TX) antenna may be different. In this case, a signal may be controlled to be transmitted to one beam forming direction through the primary transmission (P-TX) signal and the diversity transmission (D-TX) signal.

According to an embodiment, Equation 1 may represent a correlation between times (t) and phases ($\varphi$) of the primary transmission (P-TX) signal and the diversity transmission (D-TX) signal.

$$X(t) = A \cdot \cos(2\pi \times f^* t + \Phi) \quad \text{[Equation 1]}$$

For example, when time (t) is one fourths of a signal period (T), the phase ($\varphi$) may be 90°($\eta$/2).

According to an embodiment, a phase difference of the primary transmission (P-TX) signal and the diversity transmission (D-TX) signal may be expressed by [P-TX phase-D-TX phase]according to a reference signal (P-TX or D-TX). For example, when a phase delay of the diversity transmission (D-TX) signal with reference to the primary transmission (P-TX) signal is not present, the phase difference may be expressed by [0-0] as in FIG. 10A. For example, when a phase delay of the diversity transmission (D-TX) signal with reference to the primary transmission (P-TX) signal is 90°, the phase difference may be expressed by [0-90°] as in FIG. 10B. For example, when a phase delay of the primary transmission (P-TX) signal with reference to the diversity transmission (D-TX) signal is 90°, the phase difference may be expressed by [90°-0] as in FIG. 10C.

FIGS. 11A to 11C are views illustrating an operation of controlling a phase between a primary transmission (P-TX) signal and a diversity transmission (D-TX) signal by an electronic device according to various embodiments of the disclosure. For example, FIGS. 11A, 11B, and 11C may be views illustrating operations of controlling a phase between the primary transmission (P-TX) signal and the diversity transmission (D-TX) signal according to a TPC command in the case of TPC1 (e.g., [1,1] and TPC2 (e.g., [0,0]).

According to an embodiment, the electronic device 200 cannot precisely predict a beam forming direction of a high antenna efficiency. In this case, the electronic device 200 may control a relative phase offset between the primary transmission (P-TX) signal and the diversity transmission (D-TX) signal according to a target power control (TPC) algorithm 2 (3GPP TR25.863) of the base station, for example, in correspondence to the TPc command (e.g., [1, 1, 0, −1, −1]).

For example, the base station may transmit the TPC command (e.g., TPC1 (P-TX) and TPC2 (D-TX) values) for the primary transmission (P-TX) signal and the diversity transmission (D-TX) signal to the electronic device 200. For example, the transmission (TX) signal may include 1, 2, 3, . . . , and N slots. In a default state, the first phase and the second phase may be the same phase state of 0°.

Referring to FIG. 11A, the electronic device 200 may apply a relative phase offset (e.g., 48°) by controlling the second phase (e.g., 0°) of the diversity transmission (D-TX) signal with reference to the first phase (e.g., 0°) for the primary transmission (P-TX) signal in the first slot.

Referring to FIG. 11B, the electronic device 200 may apply a predetermined additional offset (e.g., +/−12°) to the second phase through comparison with the TPC command (e.g., TPC1 (P-TX) and TPC2 (D-TX).

Referring to FIG. 11C, the electronic device 200 may apply a relative phase offset (e.g., 48°) by controlling the second phase (e.g., 0°) of the diversity transmission (D-TX) signal counterclockwise with reference to the first phase (e.g., 0°) for the primary transmission (P-TX) signal in the second. Referring to FIG. 11C, as described through FIG. 11B, the electronic device 200 may apply a predetermined additional offset (e.g., +/−12°) to the second phase through comparison with the TPC command (e.g., TPC1 (P-TX) and TPC2 (D-TX).

According to an embodiment, the phase control operations as in FIGS. 11A, 11B, and 11C may be repeatedly executed for (the first slot, the second slot), (the third slot, the fourth slot), . . . , (the (N−1)-th slot, the N-th slot).

Because the phase control operations through the TPC command described through FIGS. 11A, 11B, and 11C requires adjustment of the phase offset by stages, it may take a long time to precisely generate beam forming for the primary transmission (P-TX) and the diversity transmission (D-TX) signal. For example, the beam forming time may be shortened if the phase off set is determined to be 90°, but the precision for the beam forming may be lowered. The beam forming time may become longer if the phase offset is determined to be 12°, the precision for the beam forming may be raised.

According to various embodiments, the electronic device 200 may calculate the beam forming angle value of the signal received from the base station by using the phase difference between the serving cell signals of the base station, which have been received though the diversity reception (RX) antenna in addition to an operation of controlling the phase through the TPC command. The electronic device 200 may shorten a considerable time as compared with the phase control operation by the above-described TPC command by using the calculated beam forming angle value as the beam forming angle value for transmission. According to various embodiments, the electronic device 200 may increase the precision of the phase control by controlling the beam forming angle value by using the diversity reception antennas, the number of which is larger than the two transmission antennas. In this case, the electronic device 200 may determine the beam forming angle value for the transmission signal, and may determine the first phase and the second phase of the primary transmission (P-TX) signal and the diversity transmission (D-TX) signal according to the determined beam forming angle value.

Figure 12:
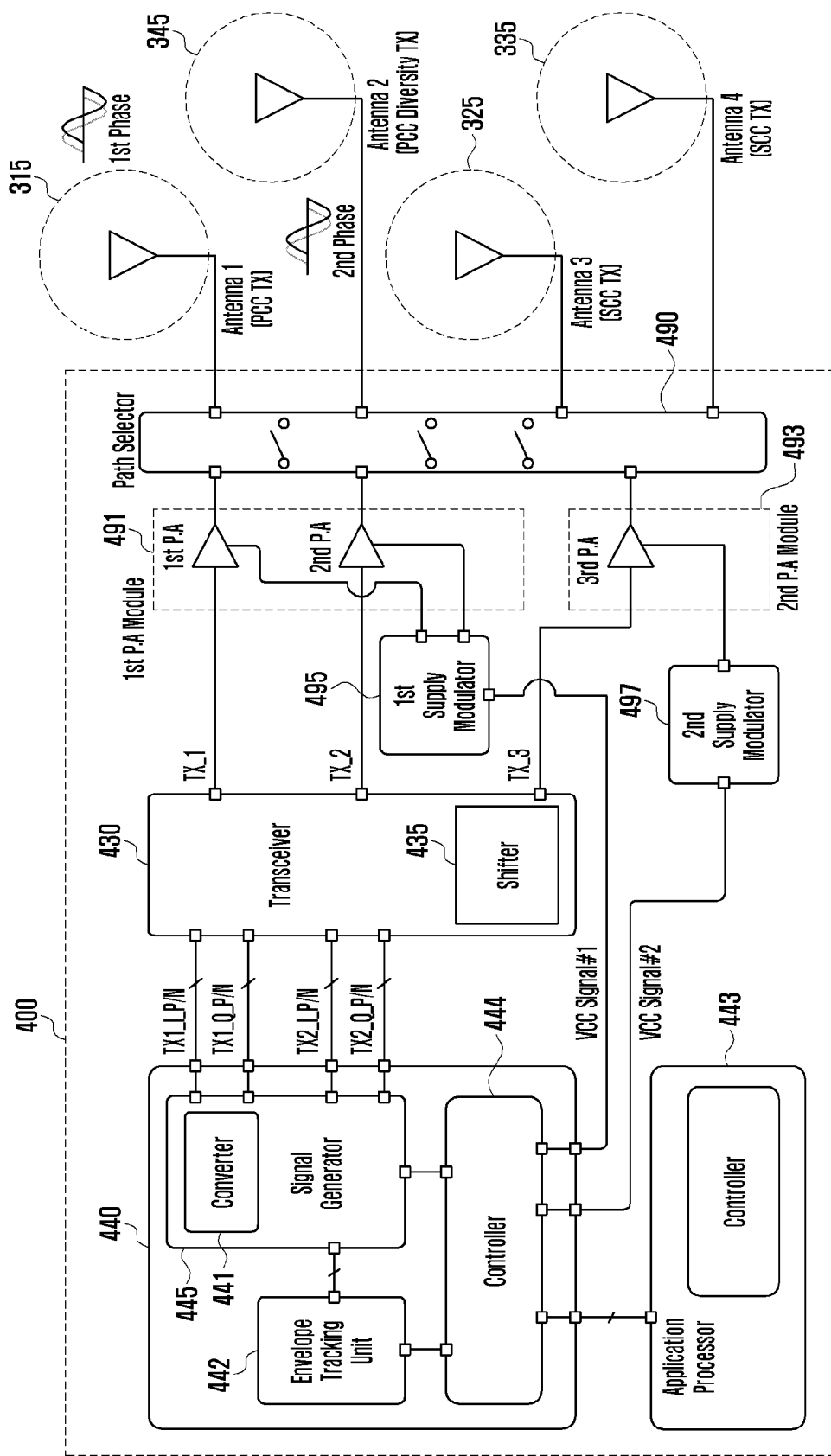
FIG. 12 is a view illustrating a configuration of a wireless communication circuit for generating a phase control signal through an electronic device according to various embodiments of the disclosure.

FIG. 12 is a view illustrating a configuration of a wireless communication circuit for generating a phase control signal through an electronic device according to various embodiments of the disclosure.

Referring to FIG. 12, the communication processor 440 of the wireless communication circuit 400 according to various embodiments of the disclosure may include a signal generator 445. The signal generator 445 may control a phase in a digital scheme. The signal generator 445 may include a converter 441. The communication processor 440 may generate the primary component carrier (PCC) signal and the secondary component carrier (SCC) signal having a phase difference through the signal generator 445 in a digital scheme. According to an embodiment, the wireless communication circuit 40C may include a portable communication device.

According to an embodiment, the converter 441 may include at least one of a modulator, a demodulator, a quadrature phase shift key (QPSK), and/or a digital-to-analog codec (DAC).

According to an embodiment, the converter 441 may generate an in-phase (I)/quadrature phase (Q) signal for transmitting application data. In this case, the signal generator 445 may control the phase between the I/Q signals in response to the target power control of the base station. The signal generator 445 may be connected to the transceiver 430 through TX1_I_P/N, TX1_Q_P/N, TX2_I_P/N, and TX2_Q_P/N. For example, the signal generator 445 may add a phase difference of 90° between the TX1_I_P/N and TX2_I_P/N signals. The signal generator 445 may add a phase difference of 90° between the TX1_Q_P/N and TX2_Q_P/N signals. Through this, the wireless communication circuit 400 may control the direction of beam forming through the third conductive portion 335 (e.g., the third conductive portion 335 of FIG. 6B or the third conductive portion 335 of FIG. 8A) and the fourth conductive portion 345 (e.g., the fourth conductive portion 345 of FIG. 6B or the fourth conductive portion 345 of FIG. 8A). In this case, the communication processor 440 of the wireless communication circuit 400 may receive application data that are to be transmitted from the application processor 443 to the network. The communication processor 440 may generate a primary transmission (TX) signal (e.g., the primary component carrier (PCC) signal) and a diversity transmission (TX) signal (e.g., the second PCC signal) through the received application data.

According to an embodiment, the first conductive portion 315 (e.g., the first conductive portion 315 of FIG. 6B or the first conductive portion 315 of FIG. 8A), the second conductive portion 325 (e.g., the second conductive portion 325 of FIG. 6B or the second conductive portion 325 of FIG. 8A), the third conductive portion 335 (e.g., the third conductive portion 335 of FIG. 6B or the third conductive portion 335 of FIG. 8A), and/or the fourth conductive portion 345 (e.g., the fourth conductive portion 345 of FIG. 6B or the third conductive portion 345 of FIG. 8A) may be connected to a pass selector 490. The pass selector 490 may perform a switching operation of the first to fourth conductive portions 315 to 345.

According to an embodiment, the wireless communication circuit 400 may amplify signals from the first to fourth conductive portions 315 to 345 under the control of the pass selector 490. The wireless communication circuit 400 may output a transmission (TX) signal such as the primary transmission (TX) signal (e.g., the first PCC signal) amplified by the first to fourth conductive portions 315 to 345 and the diversity transmission (TX) signal (e.g., the second PCC signal), and/or the secondary component carrier (SCC) signal.

According to an embodiment, the wireless communication circuit 400 may include a first power amplifier module 491 and/or a second power amplifier module 493 between the pass selector 490 and the transceiver 430. The first power amplifier module 491 and/or the second power amplifier module 493 may minimize pass losses between the first to fourth conductive portions 315 to 345 and the transceiver 430. The first power amplifier module 491 may receive electric power VCC through a first supply modulator 495. The second power amplifier module 493 may receive electric power VCC through a second supply modulator 495.

According to an embodiment, the communication processor 440 of the wireless communication circuit 400 may include an envelope tracker 442. The envelope tracker 442 may output a power signal (e.g., a VCC signal #1 and a VCC signal #2) that determine the power amplitude intensities of the first supply modulator 495 and the second supply modulator 497 through a controller 444.

According to an embodiment, the transceiver 430 of the wireless communication circuit 400 may include a phase shifter 435 (e.g., the phase shifter 435 of FIG. 6B). The phase shifter 435 may perform a phase control operation of the wireless communication circuit 400. The phase shifter 435 may control a phase in an analog scheme. The transceiver 430 may generate the primary component carrier (PCC) signal and the secondary component carrier (SCC) signal having a phase difference through the phase shifter 435.

According to an embodiment, the phase shifter 435 may include at least one of a modulator, a demodulator, a quadrature phase shift key (QPSK), and/or a digital-to-analog codec (DAC).

According to an embodiment, the communication processor 440 of the wireless communication circuit 400 may transmit digital data, which have not been modulated, to the transceiver 430. The transceiver 430 may transmit the analog signal modulated through the phase shifter 435. In this case, a delay time may be added between the digital data corresponding to the TX1 signal and the TX2 signal through the signal generator 445 included in the communication processor 440.

According to an embodiment, the transceiver 430 may convert the digital data, to which the delay time has been added, to a TX_1 signal and a TX_2 signal, which have undergone QPSK. A predetermined phase difference may occur between the TX_1 signal and the TX_2 signal, which have been converted.

According to an embodiment, the envelope tracker 442 may share the first supply modulator 495 and the second supply modulator 497. The first supply modulator 495 and the second supply modulator 497 may receive electric power from the envelope tracker 442 in proportion to the intensities of the TX_1 signal and the TX_2 signal when the TX_1 signal and the TX_2 signal are amplified.

According to an embodiment, the communication processor 440 of the wireless communication circuit 400 may determine power signals (e.g., the VCC signal #1 and the VCC signal #2) that are proportional to the intensities of the TX_1 signal and the TX_2 signal by using the envelope tracker 442. The TX_1 signal and the TX_2 signal are the signals of the same band, and may be controlled to have different phase differences. The communication processor 440 may track the intensities of the TX_1 signal and the TX_2 signal by using the envelope tracker 442, and may determine a signal that is the highest among the TX_1 signal and the TX_2 signal that have been tracked.

According to an embodiment, the envelope tracker 442 may control the first power amplifier module 491 and the second power amplifier module 493 at the same time. The first power amplifier module 491 and the second power amplifier module 493 may amplify the TX_1 signal and the TX_2 signal as the intensities of the signal increases or decreases. The power amplifier module 491 and the second power amplifier module 493 may share one of the first supply modulator 495 or the second supply modulator 497.

According to an embodiment, the communication processor 440 may deliver a track value for the tracked signal to the first supply modulator 495 or the second supply modulator 497 through the envelope tracker 442. The envelope tracker 442 may determine power signal (e.g., the VCC signal #1 and the VCC signal #2) values by tracking the degree of amplitude for the transmission signal generated by the signal generator 445. The first power amplifier module 491 may amplify the primary component carrier (PCC) signal. The second power amplifier module 493 may amplify the secondary component carrier (PCC) signal.

Figure 13:
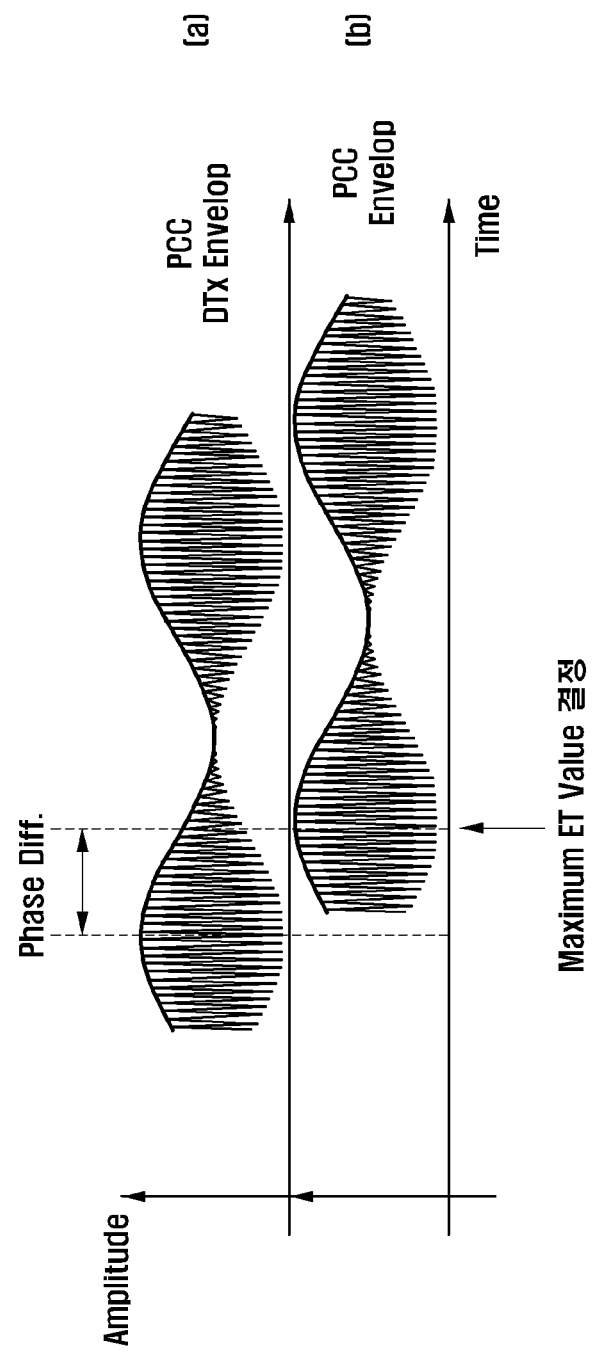
FIG. 13 is a view illustrating an operation of determining a track value for a specific signal by using an envelope tracker of an electronic device according to various embodiments of the disclosure.

FIG. 13 is a view illustrating an operation of determining a track value for a specific signal by using an envelope tracker of an electronic device according to various embodiments of the disclosure.

Referring to FIG. 13, the signal (a) on the upper side may be a waveform of the TX_1 signal illustrated in FIG. 12, and the signal (b) on the lower side may be a waveform of the TX_2 signal illustrated in FIG. 12.

The envelope tracker 442 in the communication processor 440 may determine a maximum envelop track value by using Equation 2.

$$V\_envTx = \max(V\_(envTx\text{-}PCC), V\_(envTx\_PCC\_DTX)) + \text{Offset} \quad [\text{Equation 2}]$$

For example, the primary transmission (P-TX) signal and the diversity transmission (D-TX) signal are the same frequency signal, and only the phases thereof may be different. Accordingly, the envelop tracker 442 may control the first supply modulator 495 or the second supply modulator 497 by using the maximum envelop track value.

Figure 14:
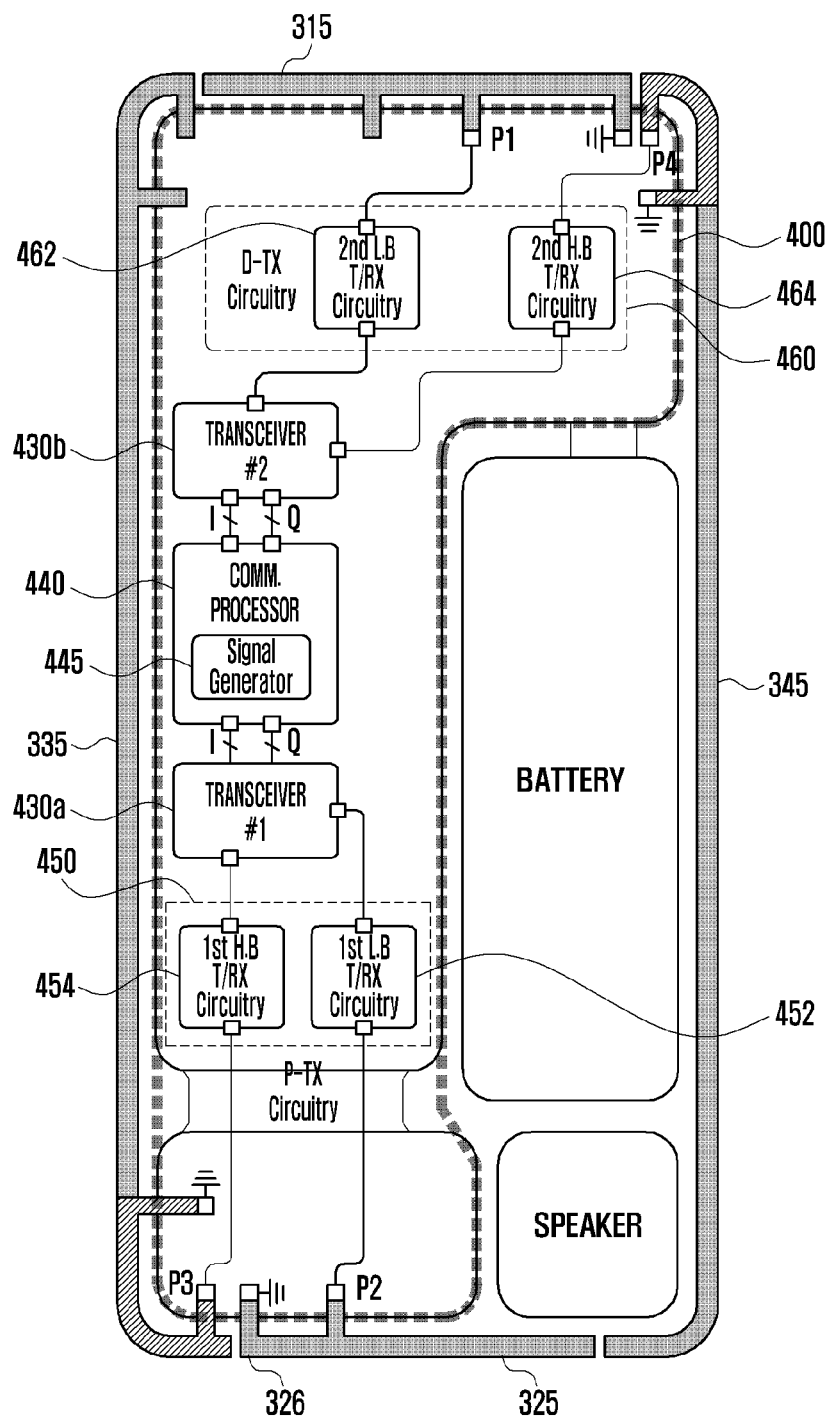
FIG. 14 is a view illustrating an embodiment of configuring a plurality of transceivers in a wireless communication circuit of an electronic device according to various embodiments of the disclosure.

FIG. 14 is a view illustrating an embodiment of configuring a plurality of transceivers in a wireless communication circuit of an electronic device according to various embodiments of the disclosure.

In the description of FIG. 14, a description of the above-described elements that are the same as those of FIGS. 6A and 6B will be omitted and only different configurations will be described.

Referring to FIG. 14, the wireless communication circuit 400 according to various embodiments of the disclosure may include a first transceiver 430a electrically connected to the first conductive portion 315 (e.g., the first conductive portion 315 of FIG. 8A) and a second transceiver 430b electrically connected to the second conductive portion 325 (e.g., the second conductive portion 325 of FIG. 8A). The first transceiver 430a may be disposed to be closer to the first conductive portion 315 that to the second conductive portion 325. The second transceiver 430a may be disposed to be closer to the second conductive portion 325 that to the first conductive portion 315.

The wireless communication circuit 400 may include a primary transmission circuit 450, a transmission diversity circuit 460, a first transceiver 430a, a communication processor 440, and/or a second transceiver 430b. The primary transmission circuit 450 may include a first low band transmission/reception circuit 452 and/or a first high band transmission/reception circuit 454. The transmission diversity circuit 460 may include a second low band transmission/reception circuit 462 and/or a second high band transmission/reception circuit 464.

The first low band transmission/reception circuit 452 may be connected to the second point P2 of the second conductive portion 325 (e.g., the second conductive portion 325 of FIG. 8A) and the second transceiver 430b. The second low band transmission/reception circuit 462 may be connected to the first transceiver 430a and the first point P1 of the first conductive portion 315 (e.g., the first conductive portion 315 of FIG. 8A). The first high band transmission/reception circuit 454 may be connected to the third point P3 of the third conductive portion 335 (e.g., the third conductive portion 335 of FIG. 8A) and the second transceiver 430b. The second high band transmission/reception circuit 464 may be connected to the first transceiver 430a and the fourth point P4 of the fourth conductive portion 345 (e.g., the fourth conductive portion 345 of FIG. 8A).

The first transceiver 430a may be connected to the communication processor 440. The second transceiver 430b may be connected to the communication processor 440. The primary transmission circuit 450 and the transmission diversity circuit 460 may be disposed to be symmetrical to each other vertically to secure an isolation performance. The physical length of the conductive line of the communication processor 440, which connects the primary transmission circuit 450 and the transmission diversity circuit 460, may become longer. In this case, the communication processor 440 may generate a phase difference due to a pass loss by the line resistance of the conductive line, and/or the difference between the lengths of the primary transmission signal and the diversity transmission signal.

According to an embodiment, in order to reduce the pass loss and/or the phase difference, the electronic device 200 according to various embodiments of the disclosure may be designed to minimize the length of the conductive line for an analog transmission signal, and maximize the length of the conductive line for transmission of a digital signal between the communication processor 440 and the transceiver (e.g., the first transceiver 430 and the second transceiver 430b). To achieve this, the electronic device 200 according to various embodiments of the disclosure may be configured such that the one transceiver 430 illustrated in FIG. 6B is divided into a first transceiver 430a and a second transceiver 430b. The first transceiver 430a may be disposed adjacent to the primary transmission circuit 450. The second transceiver 430b may be disposed adjacent to the transmission diversity circuit 460.

Figure 15:
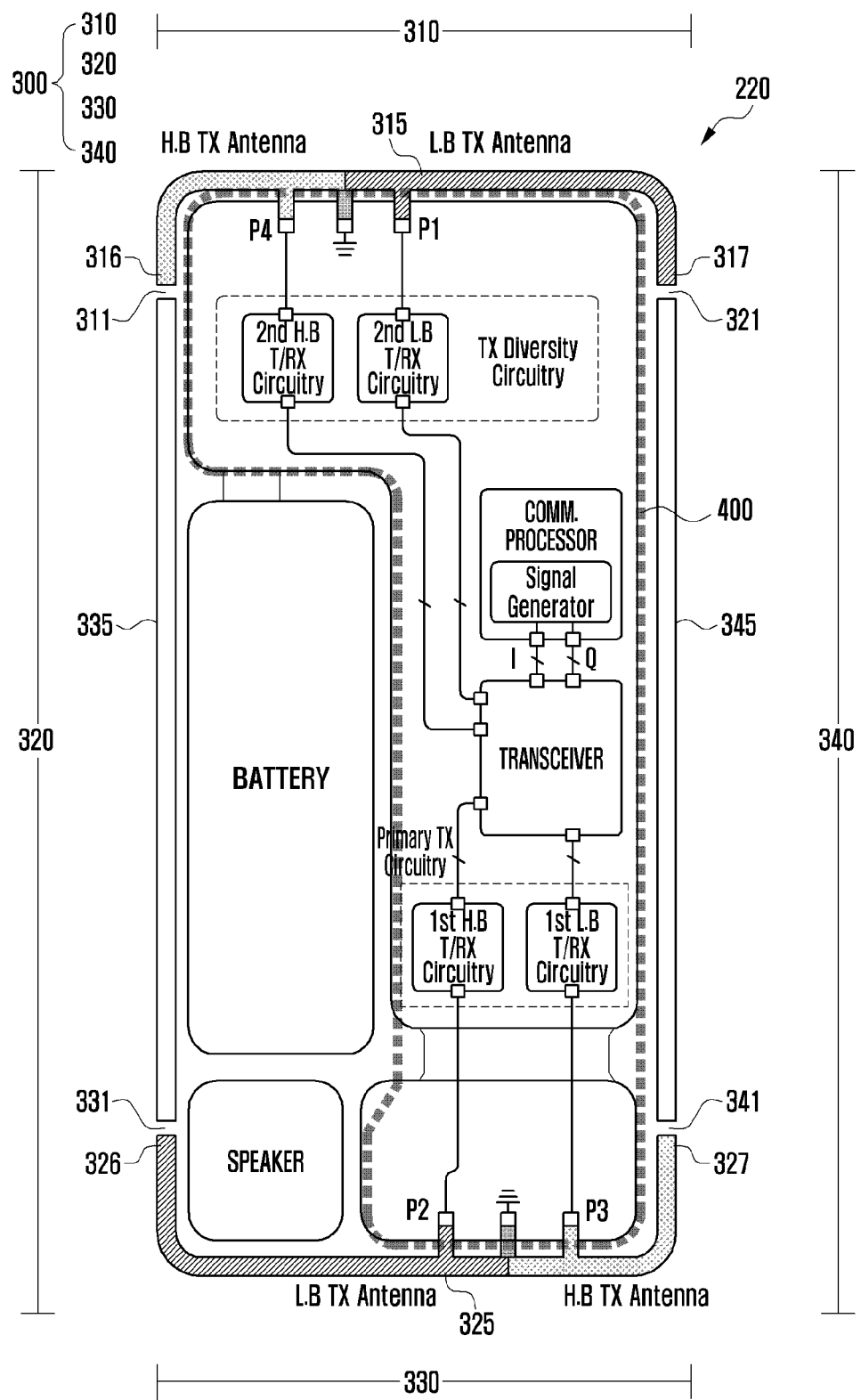
FIG. 15 is a view illustrating an embodiment of configurations of an antenna and a wireless communication circuit of an electronic device according to various embodiments of the disclosure.

FIG. 15 is a view illustrating an embodiment of configurations of an antenna and a wireless communication circuit of an electronic device according to various embodiments of the disclosure.

In the description of FIG. 15, a description of the above-described elements that are the same as those of FIGS. 6A and 6B will be omitted and only different configurations will be described.

An electronic device 200 according to various embodiments of the disclosure may include a housing 220 having a side member 300 and a wireless communication circuit 400.

The side member 300 may include a first peripheral portion 310 (e.g., the first portion), a second peripheral portion 320 (e.g., the second portion), a third peripheral portion 330 (e.g., the third portion), and a fourth peripheral portion 340 (e.g., the fourth portion). The side member 300 may include at least one first corner on one side of the first peripheral portion 310. The side member 300 may include at least one second corner on one side of the third peripheral portion 330. The first corner and the second corner may be disposed diagonally on opposite sides. The side member 300 may have a substantially rectangular shape when viewed from the upper side.

The first peripheral portion 310 may have a first length and extend in a first direction. The second peripheral portion 320 may have a second length that is larger than the first length, and may extend in a second direction that is substantially perpendicular to the first direction. The third peripheral portion 330 may have the first length that is the same as the length of the first peripheral portion 310, and may extend in parallel to the first peripheral portion 310. The fourth peripheral portion 340 may have the second length that is the same as the length of the second peripheral portion 320, and may extend in parallel to the second peripheral portion 320.

The side member 300 may include a first conductive portion 315, a second conductive portion 325, a third conductive portion 335, and a fourth conductive portion 345.

The first conductive portion 315 may extend along a portion of the second peripheral portion 320, the first peripheral portion 310, and the fourth peripheral portion 340. The first conductive portion 315 may include a first end 316 and a second end 317. The first conductive portion 315 may be a first antenna element.

The second conductive portion 325 may extend along another portion of the second peripheral portion 320, the third peripheral portion 330, and the fourth peripheral portion 340. The second conductive portion 325 may include a first end 326 and a second end 327. The second conductive portion 325 may be a second antenna element.

The third conductive portion 335 may extend from an adjacent portion of the first end 316 of the first conductive portion 315 to an adjacent portion of the first end of the second conductive portion 325 along the second peripheral portion 320. The third conductive portion 335 may be a third antenna element.

The fourth conductive portion 345 may extend from an adjacent portion of the second end 317 of the first conductive portion 315 to an adjacent portion of the second end of the second conductive portion 327 along the fourth peripheral portion 340. The fourth conductive portion 345 may be a fourth antenna element.

A first nonconductive portion 311 may be disposed between the first end 316 of the first conductive portion 315 and an end of the third conductive portion 335. A second nonconductive portion 321 may be disposed between the second end 317 of the first conductive portion 315 and an end of the fourth conductive portion 345. A third nonconductive portion 331 may be disposed between the first end 326 of the second conductive portion 325 and an opposite end of the third conductive portion 335. A fourth nonconductive portion 341 may be disposed between the second end 327 of the second conductive portion 325 and an opposite end of the fourth conductive portion 345.

A first point P1 and a fourth point P4 may be disposed at a predetermined portion of the first conductive portion 315. A second point P2 and a third point P3 may be disposed at a predetermined portion of the second conductive portion 325. The first point P1, the second point P2, the third point P3, and the fourth point P4 may define a feeding point.

A middle point between the first point P1 and the fourth point P4 in the first conductive portion 315 may be connected to a ground. A middle point between the second point P2 and the third point P3 in the second conductive portion 325 may be connected to aground. A portion of the first conductive portion 315, which is adjacent to the first nonconductive portion 311 with respect to the ground, may be used as a high band antenna. A portion of the first conductive portion 315, which is adjacent to the second nonconductive portion 321 with respect to the ground, may be used as a low band antenna. A portion of the second conductive portion 325, which is adjacent to the third nonconductive portion 331 with respect to the ground, may be used as a low band antenna. A portion of the second conductive portion 325, which is adjacent to the fourth nonconductive portion 341 with respect to the ground, may be used as a high band antenna. A plurality of grounds may be provided.

The wireless communication circuit 400 may be electrically connected to the first point P1 and the fourth point P4 of the first conductive portion 315 and/or the second point P2 and the third point P3 in the second conductive portion 325.

The first point P1 and the fourth point P4 may be adjacent to the first peripheral portion 310, and the second point P2 and the third point P3 may be adjacent to the third peripheral portion 330.

A first distance from the first point P1 of the first conductive portion 315 to the first end 316 may be larger than a second distance from the fourth point P4 of the first conductive portion 315 to the first end 316. A third distance from the second point P2 of the second conductive portion 325 to the first end 326 may be shorter than a fourth distance from the third point P3 of the second conductive portion 325 to the first end 326.

The wireless communication circuit 400 may receive at least one first downlink (DL) signal through the first point P1 and/or the second point P2 to support the downlink carrier aggregation (CA). The wireless communication circuit 400 may receive at least one second downlink (DL) signal having a frequency that is higher than the first downlink (DL) signal through the third point P3 and the fourth point P4.

The wireless communication circuit 400 may receive at least one third uplink (UL) signal through the first point P1 and/or the second point P2 to support the uplink carrier aggregation (CA). The wireless communication circuit 400 may receive at least one fourth uplink (UL) signal having a frequency that is higher than the third uplink (UL) signal through the third point P3 and the fourth point P4.

The wireless communication circuit 400 may be configured to transmit at least one fifth signal through the first point P1 and the second point P2 to support the transmission (Tx) diversity. The wireless communication circuit 400 may be configured to transmit a sixth signal, which has a frequency that is higher than the frequency of the fifth signal, through the third point P3 and the fourth point P4 to support the transmission (Tx) diversity.

The wireless communication circuit 400 may generate a first signal of the primary component carrier (PCC) and a second signal of the primary component carrier (PCC) having a phase difference from the first signal of the first signal of the primary component carrier (PCC). The first conductive portion 315 may transmit the first signal of the primary component carrier (PCC). The second conductive portion 325 may transmit the second signal of the primary component carrier (PCC). The second conductive portion 325 may transmit the same carrier signal to support the transmission (Tx) diversity.

While the disclosure has been described in detail with reference to specific embodiments, it is to be understood that various changes and modifications may be made without departing from the scope of the disclosure.

The invention claimed is:

1. An electronic device comprising:
a first plate comprising a first peripheral portion having a first length and extending in a first direction, a second peripheral portion having a second length that is longer than the first length and extending in a second direction that is substantially perpendicular to the first direction, a third peripheral portion having the first length and extending in parallel to the first peripheral portion, and a fourth peripheral portion having the second length and extending in parallel to the second peripheral portion;
a second plate facing an opposite side of the first plate;
a housing comprising a side member comprising a first conductive portion having a third length that is shorter than the first length, extending along the first peripheral portion, and comprising a first end and a second end, a second conductive portion having a fourth length that is shorter than the first length, extending along the third peripheral portion, and comprising a first end and a second end, a third conductive portion extending from a portion that is adjacent to the first end of the first conductive portion to a portion that is adjacent to the first end of the second conductive portion along the first peripheral portion, the second peripheral portion, and the third peripheral portion, a fourth conductive portion extending from a portion that is adjacent to the second end of the first conductive portion to a portion that is adjacent to the second end of the second conductive portion along the first peripheral portion, the fourth peripheral portion, and the third peripheral portion, a first nonconductive portion between the first end of the first conductive portion and the third conductive portion, a second nonconductive portion between the second end of the first conductive portion and the fourth conductive portion, a third nonconductive portion between the first end of the second conductive portion and the third conductive portion, and a fourth nonconductive portion between the second end of the second conductive portion and the fourth conductive portion, the side member surrounding a space between the first plate and the second plate;
a touch screen display visually exposed through the first plate; and
at least one wireless communication circuit electrically connected to a first point in the first conductive portion, a second point in the second conductive portion, a third point in the third conductive portion, which is adjacent to the third nonconductive portion, or a fourth point in the fourth conductive portion, which is adjacent to the second nonconductive portion,
wherein the at least one wireless communication circuit is configured to:
receive a first downlink signal through the first point or the second point and a second downlink signal, which has a frequency that is higher than the frequency of the first downlink signal, through the third point or the fourth point, to support downlink carrier aggregation;
transmit a third uplink signal through the first point or the second point and a fourth uplink signal, which has a frequency that is higher than the frequency of the third uplink signal, through the third point or the fourth point, to support uplink carrier aggregation;
transmit a fifth signal through the first point and the second point and a sixth signal, which has a frequency that is higher than the frequency of the fifth signal, through the third point and the fourth point, to support transmission diversity;
transmit the fifth signal having a first phase and a second phase through the first point and the second point, to support beam forming; and
determine a beam forming direction for at least one of the first conductive portion or the second conductive portion, by controlling a relative phase offset between the first phase and the second phase.

2. The electronic device of claim 1, wherein the at least one wireless communication circuit is configured to:

transmit the sixth signal having a third phase having a frequency that is higher than the frequency of the fifth signal and the sixth signal having a fourth phase, through the third point and the fourth point.

3. The electronic device of claim 1, wherein the at least one wireless communication circuit is configured to receive at least one frequency selected from a first downlink band having a first frequency range between 600 MHz and 1800 MHz or a second downlink band having a second frequency range between 600 MHz and 1800 MHz and which is higher than the first downlink band, as the first downlink signal,
wherein the first downlink band has a frequency range between 850 MHz and 900 MHz, and
wherein the second downlink band has a frequency range between 900 MHz and 1000 MHz.

4. The electronic device of claim 3, wherein the at least one wireless communication circuit is configured to receive at least one frequency selected from a third downlink band, a fourth downlink band that is higher than the third downlink band, or a fifth downlink band that is higher than the fourth downlink band, as the second downlink signal, and
wherein the third downlink band, the fourth downlink band, and the fifth downlink band have frequency ranges selected from predetermined frequencies.

5. The electronic device of claim 4, wherein the third downlink band has a frequency range between 1800 MHz and 1900 MHz, and
wherein the fourth downlink band has a frequency range between 2100 MHz and 2200 MHz, and the fifth downlink band has a frequency range between 2600 MHz and 2700 MHz.

6. The electronic device of claim 1, wherein the at least one wireless communication circuit is configured to transmit at least one frequency selected from a first uplink band having a first frequency range between 600 MHz and 1800 MHz and a second uplink band having a second frequency range between 600 MHz and 1800 MHz and which is higher than the first uplink band, as the third uplink signal.

7. The electronic device of claim 6, wherein the fourth uplink signal has a third uplink band, a fourth uplink band that is higher than the third uplink band, and a fifth uplink band that is higher than the fourth uplink band, and
wherein the third to fifth uplink bands have frequency ranges selected from frequencies between 1500 MHz and 2700 MHz.

8. The electronic device of claim 1, wherein the at least one wireless communication circuit comprises:
a first transceiver electrically connected to the first conductive portion; and
a second transceiver electrically connected to the second conductive portion, and
wherein the first transceiver is located to be closer to the first conductive portion that to the second conductive portion, and the second transceiver is located to be closer to the second conductive portion that to the first conductive portion.

9. An electronic device comprising:
a housing comprising a side member defining sides of the electronic device;
a touchscreen display, at least a portion of which is housed in the housing, to be visually exposed to the outside;
a first conductive portion defined by a first portion of the side member;
a second conductive portion defined by a second portion of the side member;
a third conductive portion defined by a third portion of the side member;
a fourth conductive portion defined by a fourth portion of the side member; and
at least one wireless communication circuit electrically connected to a first point in the first portion, a second point in the second portion, a third point in the third portion, and a fourth point in the fourth portion, the first point is spaced apart from the third point by a first distance, the second point is spaced apart from the third point by a second distance that is smaller than the first distance, and the fourth point is spaced apart from the third point by a third distance that is larger than the first distance,
wherein the at least one wireless communication circuit is configured to:
transmit a primary component carrier signal through the third conductive portion and the fourth conductive portion, to support transmission diversity;
transmit a secondary component carrier signal through the first conductive portion or the second conductive portion, to support uplink carrier aggregation;
transmit a signal having a first phase and a second phase through the first point and the second point, to support beam forming; and
determine a beam forming direction for at least one of the first conductive portion or the second conductive portion, by controlling a relative phase offset between the first phase and the second phase.

10. The electronic device of claim 9, wherein the at least one wireless communication circuit is configured to:
receive a downlink signal through the third conductive portion;
transmit a first signal of the primary component carrier signal through the third conductive portion;
transmit a second signal of the primary component carrier signal through the fourth conductive portion, to support transmission diversity, together with the first signal of the primary component carrier signal; and
transmit a signal for executing uplink carrier aggregation through the first conductive portion.

11. An electronic device comprising:
a housing comprising a side member defining sides of the electronic device;
a touchscreen display, at least a portion of which is housed in the housing, to be visually exposed to the outside;
a first conductive portion defined by a first portion of the side member;
a second conductive portion defined by a second portion of the side member, which is located on a side that is opposite to the first portion when viewed from an upper side of the touch screen display exposed to the outside; and
at least one wireless communication circuit electrically connected to a first point in the first portion and a second point in the second portion,
wherein the at least one wireless communication circuit is configured to:
generate a first signal having a first phase of a primary component carrier and a second signal having a second phase of the primary component carrier;
transmit the first signal through the first conductive portion;
transmit the second signal through the second conductive portion, to support transmission diversity;
transmit the first signal having the first phase and the second signal having the second phase through the first point and the second point, to support beam forming; and determine a beam forming direction for at least one of the first conductive portion or the second conductive portion, by controlling a relative phase offset between the first phase and the second phase.

12. The electronic device of claim 11, wherein the side member has a substantially rectangular shape comprising a first corner and a second corner that is diagonally opposite to the first corner when viewed from the upper side of the touchscreen display, wherein the first portion is located in an area that is adjacent to the first corner, and the second portion is located in an area that is adjacent to the second corner.

13. The electronic device of claim 11, wherein the at least one wireless communication circuit comprises:
   a digital signal processor configured to generate the first signal and the second signal in a digital scheme; and
   a phase shifter configured to generate the first signal and the second signal in an analog scheme.

14. An electronic device comprising:
   a first plate comprising a first peripheral portion having a first length and extending in a first direction, a second peripheral portion having a second length that is longer than the first length and extending in a second direction that is substantially perpendicular to the first direction, a third peripheral portion having the first length and extending in parallel to the first peripheral portion, and a fourth peripheral portion having the second length and extending in parallel to the second peripheral portion;
   a second plate facing an opposite side of the first plate;
   a housing comprising a side member comprising a first conductive portion extending along the second peripheral portion, the first peripheral portion, and the fourth peripheral portion, and comprising a first end and a second end, a second conductive portion extending along the second peripheral portion, the third peripheral portion, the fourth peripheral portion, and comprising a first end and a second end, a third conductive portion extending from a portion that is adjacent to the first end of the first conductive portion to a portion that is adjacent to the first end of the second conductive portion along the second peripheral portion, a fourth conductive portion extending from a portion that is adjacent to the second end of the first conductive portion to a portion that is adjacent to the second end of the second conductive portion along the fourth peripheral portion, a first nonconductive portion between the first end of the first conductive portion and the third conductive portion, a second nonconductive portion between the second end of the first conductive portion and the fourth conductive portion, a third nonconductive portion between the first end of the second conductive portion and the third conductive portion, and a fourth nonconductive portion between the second end of the second conductive portion and the fourth conductive portion, the side member surrounding a space between the first plate and the second plate;
   a touch screen display visually exposed through the first plate; and
   at least one wireless communication circuit electrically connected to a first point in the first conductive portion, a second point in the second conductive portion, a third point in the second conductive portion, and a fourth point in the first conductive portion,
   wherein the first point and the fourth point are adjacent to the first peripheral portion and the second point and the third point are adjacent to the third peripheral portion,
   wherein a first distance from the first point to the first end of the first conductive portion is larger than a second distance from the fourth point to the first end of the first conductive portion, the first conductive portion is connected to a first ground, the first point is present adjacent to the second end of the first conductive portion with respect to the first ground, and the fourth point is present adjacent to the first end of the first conductive portion with respect to the first ground,
   wherein a third distance from the second point to the first end of the second conductive portion is shorter than a fourth distance from the third point to the first end of the second conductive portion, the second conductive portion is connected to a second ground, the second point is present adjacent to the first end of the second conductive portion with respect to the second ground, and the third point is present adjacent to the second end of the second conductive portion with respect to the second ground, and
   wherein the at least one wireless communication circuit is configured to:
     receive a first downlink signal through the first point or the second point and a second downlink signal, which has a frequency that is higher than the frequency of the first downlink signal, through the third point or the fourth point to support downlink carrier aggregation;
     transmit a third uplink signal through the first point or the second point and a fourth uplink signal, which has a frequency that is higher than the frequency of the third uplink signal, through the third point or the fourth point to support uplink carrier aggregation;
     transmit a fifth signal through the first point and the second point and a sixth signal, which has a frequency that is higher than the frequency of the fifth signal, through the third point and the fourth point to support transmission diversity;
     transmit the fifth signal having a first phase and a second phase through the first point and the second point, to support beam forming; and
     determine a beam forming direction for at least one of the first conductive portion or the second conductive portion, by controlling a relative phase offset between the first phase and the second phase.

15. The electronic device of claim 14, wherein the at least one wireless communication circuit is configured to receive at least one frequency selected from a first downlink band having a first frequency range between 600 MHz and 1800 MHz or a second downlink band having a second frequency range between 600 MHz and 1800 MHz and which is higher than the first downlink band, as the first downlink signal.

* * * * *